United States Patent
Hansson et al.

(10) Patent No.: US 10,339,050 B2
(45) Date of Patent: Jul. 2, 2019

(54) APPARATUS INCLUDING A MEMORY CONTROLLER FOR CONTROLLING DIRECT DATA TRANSFER BETWEEN FIRST AND SECOND MEMORY MODULES USING DIRECT TRANSFER COMMANDS

(71) Applicant: ARM Limited, Cambridge (GB)

(72) Inventors: Andreas Hansson, Cambridge (GB); Wendy Arnott Elsasser, Austin, TX (US); Michael Andrew Campbell, Waterbeach (GB)

(73) Assignee: Arm Limited, Cambridge (GB)

( * ) Notice: Subject to any disclaimer, the term of this patent is extended or adjusted under 35 U.S.C. 154(b) by 169 days.

(21) Appl. No.: 15/273,743

(22) Filed: Sep. 23, 2016

(65) Prior Publication Data

US 2018/0089079 A1 Mar. 29, 2018

(51) Int. Cl.
*G06F 12/06* (2006.01)
*G06F 13/16* (2006.01)
(Continued)

(52) U.S. Cl.
CPC ........ *G06F 12/0623* (2013.01); *G06F 12/084* (2013.01); *G06F 12/0888* (2013.01); *G06F 13/1663* (2013.01); *G06F 13/4234* (2013.01); *G06F 2212/6046* (2013.01); *Y02D 10/14* (2018.01); *Y02D 10/151* (2018.01)

(58) Field of Classification Search
CPC ............. G06F 12/0623; G06F 12/0888; G06F 12/084; G06F 13/1663; G06F 13/4234; G06F 2212/6046; Y02D 10/14; Y02D 10/151
See application file for complete search history.

(56) References Cited

U.S. PATENT DOCUMENTS

2005/0177695 A1 8/2005 Larson et al.
2008/0140914 A1* 6/2008 Jeon ..................... G06F 13/1673
711/103

(Continued)

FOREIGN PATENT DOCUMENTS

WO WO 2013/002799 1/2013

*Primary Examiner* — Glenn Gossage

(74) *Attorney, Agent, or Firm* — Leveque IP Law, P.C.

(57) ABSTRACT

An apparatus, memory controller, memory module and method are provided for controlling data transfer in memory. The apparatus comprises a memory controller and a plurality of memory modules. The memory controller orchestrates direct data transfer by issuing a first direct transfer command to a first memory module and a second direct transfer command to a second memory module. The first memory module is responsive to receipt of the first direct transfer command to directly transmit the data for receipt by the second memory module in a way that bypasses the memory controller. The second memory module is responsive to the second direct transfer command to receive the data from the first memory module directly, rather than via the memory controller. One of the first and second memory modules may be used as a cache for data stored in the other memory module. The direct data transfer may comprise a data move or a data copy operation. This provides an efficient mechanism for transferring data between multiple memory modules coupled to the same memory controller.

17 Claims, 16 Drawing Sheets

(51) Int. Cl.
    *G06F 12/084*     (2016.01)
    *G06F 12/0888*    (2016.01)
    *G06F 13/42*      (2006.01)

(56) References Cited

U.S. PATENT DOCUMENTS

| | | |
|---|---|---|
| 2015/0058701 A1 | 2/2015 | Xing et al. |
| 2016/0196223 A1 | 7/2016 | Lee et al. |
| 2016/0259739 A1* | 9/2016 | Woo .................... G06F 13/1673 |
| 2017/0123670 A1* | 5/2017 | Jayasena ................. G06F 3/061 |
| 2017/0371560 A1* | 12/2017 | MacGarry ............. G06F 3/0604 |
| 2018/0113614 A1* | 4/2018 | Lee ........................ G06F 3/061 |

\* cited by examiner

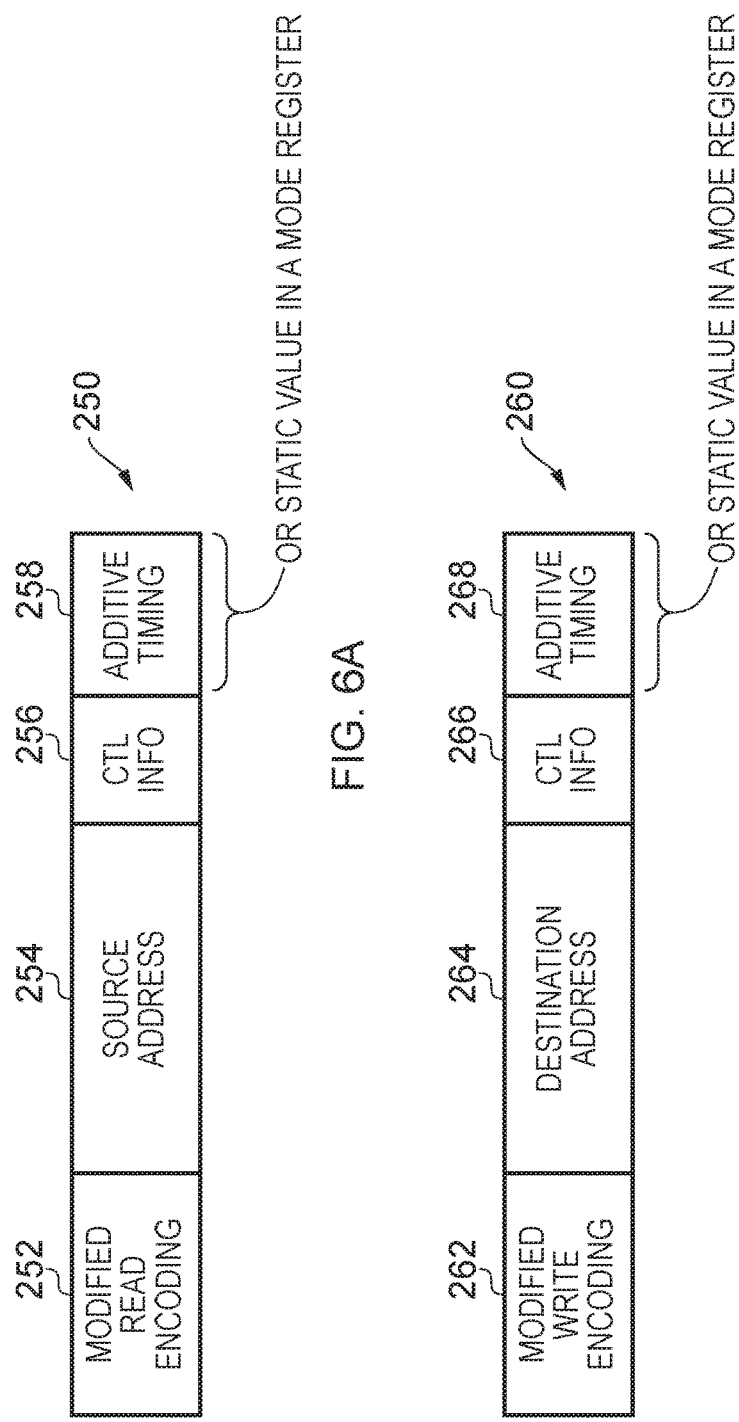

APPARATUS INCLUDING A MEMORY CONTROLLER FOR CONTROLLING DIRECT DATA TRANSFER BETWEEN FIRST AND SECOND MEMORY MODULES USING DIRECT TRANSFER COMMANDS

BACKGROUND

The present technique relates to an apparatus, memory controller, memory module and method for controlling data transfer in memory.

Within modern data processing systems, it is known to provide a memory controller for controlling access to a portion of memory. Hence, access requests from one or more sources may be routed to the memory controller, which then sends appropriate commands to the portion of memory to cause read and write operations to be performed in order to process the access requests. For a read operation, the read data is returned from the memory to the memory controller, and for a write operation the write data is output from the memory controller to the memory.

Often the portion of memory controlled by the memory controller will be formed of a plurality of memory modules, and the memory controller can perform read or write operations to each of the memory modules.

Memory access operations can incur significant power consumption and introduce significant latency, and accordingly it is desirable to seek to provide improved techniques for performing data transfer in memory.

SUMMARY

In one example configuration, there is provided an apparatus comprising: a memory controller and a plurality of memory modules; wherein: the memory controller, in order to control direct data transfer, is configured to: transmit a first direct transfer command to a first memory module of the plurality of memory modules, wherein the first direct transfer command comprises information indicating that the first memory module should transmit data bypassing the memory controller; and transmit a second direct transfer command to a second memory module of the plurality of memory modules, wherein the second direct transfer command comprises information indicating that the second memory module should store the data received directly from the first memory module; and wherein the first memory module is configured to: receive the first direct transfer command from the memory controller; and directly transmit the data for receipt by the second memory module in dependence on the first direct transfer command; and the second memory module is configured to: receive the second direct transfer command from the memory controller; receive the data from the first memory module directly; and store the data in dependence on the second direct transfer command.

In another example configuration, there is provided a memory controller configured, in order to control direct data transfer, to: transmit a first direct transfer command to a first memory module, wherein the first direct transfer command comprises information indicating that the first memory module should transmit data bypassing the memory controller; and transmit a second direct transfer command to a second memory module, wherein the second direct transfer command comprises information indicating that the second memory module should store data received directly from the first memory module.

In a further example configuration, there is provided a memory module configured, in order to implement direct data transfer, to: receive a direct transfer command from a memory controller, wherein the direct transfer command comprises information indicating that the memory module should transmit data bypassing the memory controller; and directly transmit data for receipt by a further memory module in dependence on the direct transfer command, such that the transmitted data bypasses the memory controller.

In a yet further example configuration, there is provided a memory module configured, in order to implement direct data transfer, to: receive a direct transfer command from a memory controller, wherein the direct transfer command comprises information indicating that the memory module should store data received directly from a further memory module; receive data from the further memory module directly that has bypassed the memory controller; and store the data in dependence on the direct transfer command.

In a still further example configuration, there is provided a method comprising: transmitting a first direct transfer command from a memory controller to a first memory module, wherein the first direct transfer command comprises information indicating that the first memory module should transmit data bypassing the memory controller; transmitting a second direct transfer command from the memory controller to a second memory module, wherein the second direct transfer command comprises information indicating that the second memory module should store data received directly from the first memory module; transmitting data from the first memory module to the second memory module directly in dependence on the first direct transfer command; and storing the data in the second memory module in dependence on the second direct transfer command.

BRIEF DESCRIPTION OF THE DRAWINGS

The present technique will be described further, by way of example only, with reference to embodiments thereof as illustrated in the accompanying drawings, in which:

FIGS. 6A and 6B schematically illustrate fields that may be provided within the modified read and modified write commands in accordance with one embodiment;

DESCRIPTION OF EMBODIMENTS

Figure 1:
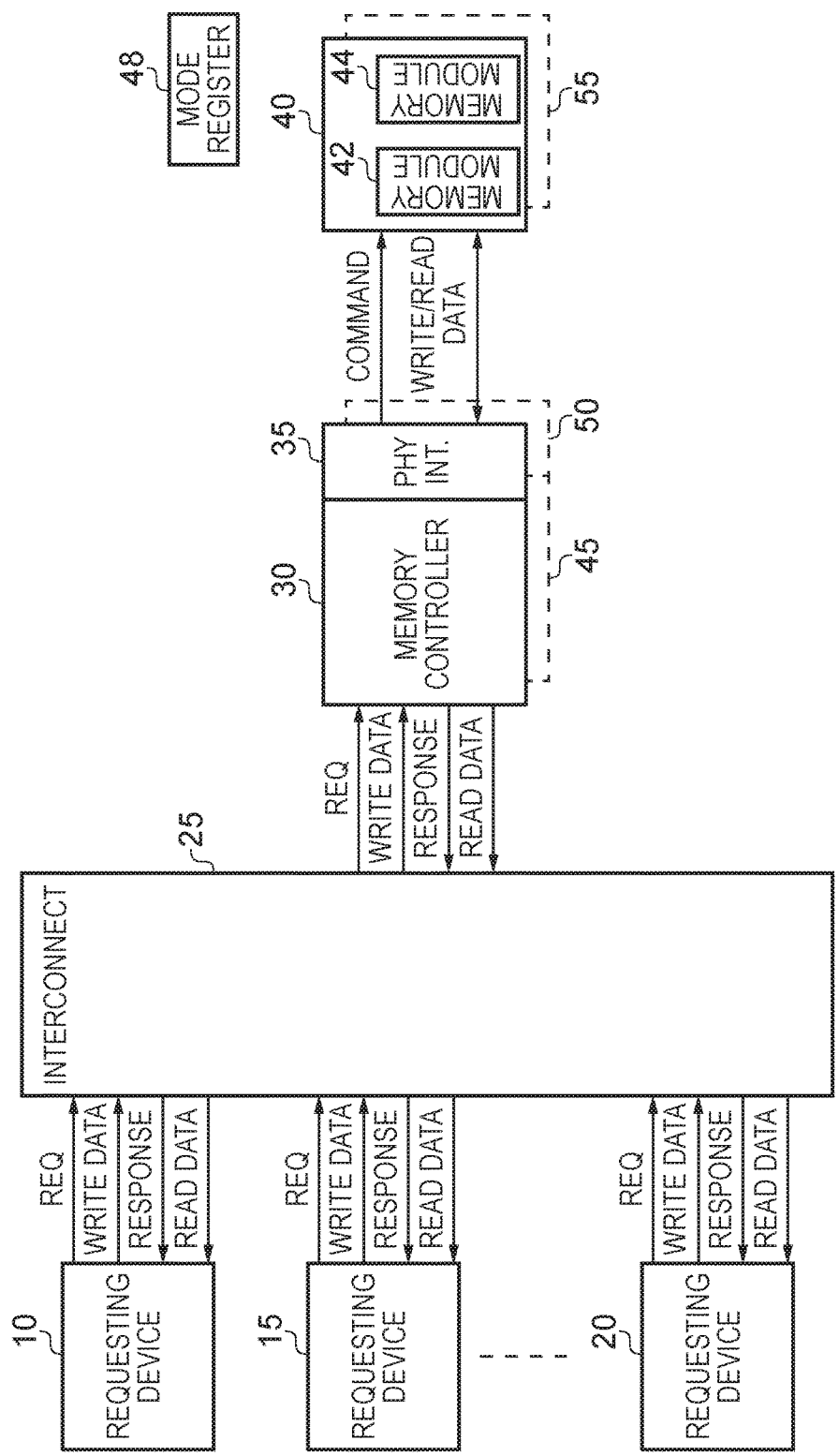
FIG. 1 is a block diagram of a data processing system in accordance with one embodiment.

Before discussing the embodiments with reference to the accompanying figures, the following description of embodiments is provided.

In accordance with one embodiment, an apparatus is provided that comprises a memory controller and a plurality of memory modules. Direct data transfer between the memory modules is supported. In particular, the memory controller is configured to control such a direct data transfer by transmitting a first direct transfer command to a first memory module and a second direct transfer command to a second memory module. Whilst in one embodiment the first direct transfer command may be a separate command to the second direct transfer command, with the first memory module receiving the first direct transfer command and the second memory module receiving the second direct transfer command, in an alternative embodiment the first and second direct transfer commands may in fact be the same command which is received by both the first memory module and the second memory module, that single command providing the information required by both the first memory module and the second memory module.

The first direct transfer command comprises information indicating that the first memory module should transmit data bypassing the memory controller, and the second direct transfer command comprises information indicating that the second memory module should store the data received directly from the first memory module.

Following receipt of the first direct transfer command from the memory controller, the first memory module is configured to directly transmit the data for receipt by the second memory module in dependence on that first direct transfer command. The second memory module is then arranged, following receipt of the second direct transfer command, to receive the data from the first memory module directly and to store that data in dependence on the second direct transfer command.

In typical systems it is traditionally the case that all of the memory modules are essentially identical, and together form a uniform address space, potentially interleaved across the various memory modules. Within such an environment, the memory controller is arranged to process read requests by reading data from the relevant memory module and providing that data to a request source, and is arranged to process write requests by outputting write data from a request source to the relevant memory module for storage therein. Which memory module is accessed will depend on the address specified by the request source.

However, the inventors realised that with emerging technologies there is likely to be a need to transfer data from one memory module to another. Using existing techniques, this would involve the memory controller issuing a read command to read data from one memory module, and then, once that data is received by the memory controller, the memory controller would subsequently output a write command along with that data in order to cause that data to be written to a different memory module.

The technique of the described embodiments aims to alleviate the latency and power consumption associated with such data transfers, by providing a mechanism which avoids the data itself needing to be routed through the memory controller, whilst allowing the memory controller to still orchestrate the data transfer.

In particular, in accordance with the present technique, the memory controller still communicates directly with the first memory module and the second memory module in order to cause the data transfer to take place, but the data itself is not routed via the memory controller, and instead the operations of the first and second memory modules are coordinated so that the data output by the first memory module can be received directly by the second memory module for storage therein.

The first and second direct transfer commands can take a variety of forms. Whilst in one embodiment the first direct transfer command may explicitly identify to the first memory module that the second memory module is to receive the output data, and the second direct transfer command may explicitly identify to the second memory module that it is to receive data from the first memory module, in other embodiments there is no requirement for the first memory module to know the recipient for the data that it is to output in response to the first direct transfer command, or for the second memory module to explicitly know the source memory module from which it is receiving data when it processes the second direct transfer command.

In particular, in some embodiments the first and second direct transfer commands may cause the timing of the operations performed by the first memory module and the second memory module to be coordinated so as to ensure that when the first memory module outputs the data onto a communications infrastructure accessible to the second memory module as a result of processing the first direct transfer command, the second memory module is at that point ready to receive that data from the communications infrastructure via its processing of the second direct transfer command. One or both of the first memory module and the second memory module may also be responsive to the direct transfer commands to perform other ancillary operations required by the data transfer that would naturally be performed by the memory controller were the data to be routed through the memory controller in the standard manner, but which cannot readily be performed by the memory controller when the data is being transferred directly between the memory modules. For example, as will be discussed in more detail below, at least one of the memory modules may perform one or more operations to ensure compliance of the direct data transfer with communication protocol rules of the communications infrastructure.

It should be noted that use of the term "directly" herein, for example when describing the first memory module as directly transmitting the data for receipt by the second memory module, and describing the second memory module as receiving the data from the first memory module directly, is intended to refer to the functionality achieved via performance of the first and second direct transfer commands, whereby the data passes from the first memory module to the second memory module without being routed via the memory controller, which can reduce latency and power consumption, and result in higher efficiency in the use of the communications infrastructure. However, there is no restriction on how the first and second memory modules are physically interconnected in order to achieve the described direct transfer functionality. Hence, whilst in one embodiment a direct physical link may be provided between the first and second memory modules, this is not a requirement, and any suitable path may be used by which the data is directly routed from the first memory module to the second memory module without that data being routed through the memory controller. Hence, for example, one or more intervening components (such as additional memory modules) may be located in the physical path between the first memory module and the second memory module whilst still allowing the first memory module to output data that can be directly received by the second memory module, i.e. without that data first having to be returned to the memory controller for subsequent onward propagation to the second memory module.

The memory controller and the plurality of memory modules can be arranged to communicate in a variety of ways. In one embodiment the apparatus further comprises a communications infrastructure interconnecting the memory controller and the plurality of memory modules, with the memory controller having a shared interface to communicate with the plurality of memory modules. The memory controller may control the direct data transfer between the first memory module and the second memory module by issuing the first and second direct transfer commands via the shared interface, and the first memory module and the second memory module may operate in response to the first and second direct transfer commands so as to cause the data to be transferred over the communications infrastructure from the first memory module to the second memory module bypassing the memory controller.

By using the direct data transfer approach of the described embodiments, this can significantly reduce bandwidth and power consumption that would be incurred were the traditional approach to be adopted whereby the memory controller would read the data from the first memory module back through its shared interface, and then output that data via a separate write command from the shared interface to the second memory module.

There are a number of ways in which the first and second memory modules can respond to the first and second direct transfer commands, respectively. In one embodiment, issuance by the memory controller of the first and second direct transfer commands causes the first memory module to perform a read operation to output the data onto the communications infrastructure, and to cause the second memory module to perform a write operation to store the data output onto the communications infrastructure by the first memory module, a relative timing of the read operation and the write operation being controlled to ensure that at the time the write operation is performed by the second memory module, the first memory module is outputting the data onto the communications infrastructure. By controlling the relative timing of the operations performed by the first memory module and the second memory module, this can allow the second memory module, when performing its write operation in response to the second direct transfer command, to be directly provided at that point in time with the data read by the first memory module. In some embodiments, there is hence no requirement for the second memory module to be aware of where the data it is writing originated from.

There are a number of ways in which the relative timing may be specified. In one embodiment, the first direct transfer command comprises a read command issued to the first memory module and the second direct transfer command comprises a write command issued to the second memory module, and the read command and the write command specifying the relative timing for the read operation and the write operation. The relative timing can be encoded in a variety of ways. For example, in one embodiment the read and write commands could be modified read and write commands, and the relative timing may be encoded directly into fields of the modified read command and/or modified write command. However, in an alternative embodiment, such relative timing values may be pre-programmed into a storage element such as a mode register, which will then be referenced by the first and second memory modules when performing the read and write operations specified by the read and write commands.

Whilst the direct data transfer technique of the described embodiments allows the memory controller to still orchestrate the data transfer, whilst avoiding the need for the data itself to be routed through the memory controller, thereby giving rise to bandwidth and performance benefits, in some implementations certain related activities that a memory controller might normally perform in association with standard read and/or write operations can become difficult for the memory controller to perform when the data itself is not passed through the memory controller. In one embodiment, certain of these tasks can be devolved to either or both of the first and second memory modules, with the first and/or second direct transfer commands causing those tasks to be performed by the memory module(s). For example, in one embodiment, at least one of the first memory module and the second memory module comprises direct transfer handling circuitry to perform at least one operation to ensure compliance of the direct data transfer with communication protocol rules of the communications infrastructure.

In one embodiment, the direct transfer handling circuitry is provided in at least the first memory module and, when the first memory module responds to the first direct transfer command by performing a read operation, performs a check code generation operation to generate a check code for that data which is then output to the second memory module in association with the read data. In situations where the memory controller itself issues a write command along with associated write data to be written into a memory module, the memory controller can generate a check code (for example a cyclic redundancy check (CRC) code) in association with the write data, in order to enable the recipient memory module to check that the data it receives is correct. However, when adopting the direct data transfer technique of the described embodiments, such functionality would become difficult/impractical to implement by the memory controller, and instead in accordance with the described embodiment, the first memory module is configured to generate a check code when performing a read operation in response to the first direct transfer command. This then enables the second memory module to perform the usual checks that it would perform when processing a write operation.

In one embodiment, the first and second memory modules comprise a physical layer interface for coupling to the communications infrastructure. Similarly, the memory controller will also have a physical layer interface for coupling to the communications infrastructure. The physical layer interface is provided for managing the communication over the communications infrastructure to take into account the nature of the physical connections between the memory controller and the memory modules. That physical connection will typically comprise multiple relatively long physical wire connections, and may for example be required to operate as a parallel interface at high speed. The physical layer interface operates in a manner to maintain synchronised communication across that physical connection between the memory controller and the memory modules.

Due to the nature of the physical connection, time varying effects can be introduced that can affect the ability to correctly synchronise the various signals, and hence it is typically the case that such a physical layer interface needs to be subjected to a periodic training operation during which test commands are issued over the physical connections in order to enable performance of any necessary recalibration of the phase delay circuits and the like used to ensure synchronised communication between the memory controller and the memory modules.

Typically, such a training operation is performed by the memory controller, since all of the relevant paths to be tested either emanate from, or terminate at, the memory controller. However, in accordance with the direct data transfer technique of the described embodiments, there are additional paths via which data is routed in a manner that bypasses the memory controller. In accordance with one embodiment, the direct transfer handling circuitry within one or both of the first and second memory modules can also perform training operations in order to ensure that synchronised communication is maintained across the various paths used during direct data transfer. In particular, in one embodiment the direct transfer handling circuitry comprises training circuitry, responsive to a training event, to perform a training operation of a corresponding physical layer interface in order to determine control values used to control timing of signals issued during performance of a direct data transfer between the first memory module and the second memory module.

Furthermore, in one embodiment the direct transfer handling circuitry further comprises synchronisation control circuitry to store the control values determined during the training operation, and to use the stored control values to control the timing of signals issued during a subsequent performance of the direct data transfer. Hence the control values required are stored locally within the memory modules so as to facilitate correct synchronised communication when directly transferring data between the memory modules.

It is known to employ termination circuits within the memory controller and the memory modules in order to improve signal integrity during data transfer over the communications infrastructure. In accordance with such termination techniques (often referred to as on-die termination (ODT)), termination resistor circuitry within the memory controller and within the memory modules is used for impedance matching in the transmission lines. However, when supporting the direct data transfer techniques of the described embodiments, the issue of termination becomes more complex, due to the different paths by which data may be communicated. In one embodiment, this problem is alleviated by the direct transfer handling circuitry comprising termination control circuitry to perform a termination setting operation to configure termination components within the associated memory module dependent on whether a currently processed command identifies the direct data transfer or identifies a transfer to be performed between the memory controller and the associated memory module. Hence, the termination settings applied within the memory modules can be varied dependent on whether normal transfers via the memory controller are taking place, or instead direct data transfers are taking place.

Furthermore, in one embodiment, when the currently processed command identifies the direct data transfer, the termination setting operation configures the termination components within the associated memory module dependent on whether the associated memory module is the first memory module or the second memory module. Hence, the termination settings applied by the source memory module and destination memory module may be different. The termination settings can also be varied amongst the other components connected to the communications infrastructure, whether they be additional memory modules not party to the current direct data transfer, or the memory controller itself which is being bypassed during the direct data transfer.

There are a number of ways in which the memory controller can be configured to generate the necessary first and second direct transfer commands required to cause the direct data transfer to be performed. In particular, the memory controller may receive access requests from a variety of sources, and in one embodiment can detect situations where such an access request requires data to be transferred between the first and second memory modules, and in that instance to cause the required direct transfer commands to be generated. In particular, in one embodiment the memory controller comprises direct transfer control circuitry that is responsive to a transfer access request received by the memory controller that requires data to be transferred between the first and second memory modules, to control generation of the first and second direct transfer commands required to cause the direct data transfer to be performed.

In one embodiment, the memory controller comprises a pending access requests buffer to store pending access requests to be processed, and the direct transfer control circuitry is responsive to the presence of a transfer access request in the pending access requests buffer that requires data to be transferred between the first and second memory modules, to update the pending access requests buffer to identify the first and second direct transfer commands required to cause the direct data transfer to be performed. Hence, in such an embodiment the direct transfer control circuitry can monitor the contents of the pending access requests buffer in order to detect situations where the source and destination addresses for a transfer access request reside within the first and second memory modules, respectively, and in that instance can update the contents of the pending access requests buffer so as to cause the earlier-mentioned first and second direct transfer commands to subsequently be issued when that transfer access request is processed.

As mentioned earlier, the inventors realised that with emerging technologies there is likely to be a need to transfer data from one memory module to another. For example, it is possible that the first memory module will have a different memory characteristic than the second memory module. The memory characteristic that is different can take a variety of forms, for example the relative performance of the two memory modules may be different, the density of the memory storage elements may be different, the physical construction itself may be different, the persistency of data within the memory storage elements of the different memory modules may be different, etc. This is likely to become more common with the advent of additional types of memory that can be used in addition to the more standard memory such as dynamic random access memory (DRAM).

For example, with the advent of Storage Class Memory (SCM), new types of memory modules are emerging that contain a different type of memory, such as Phase Change Memory (PCM), 3D XPoint, etc. These SCM memory modules may use a different protocol, for example NVDIMM-P, or the proprietary DDR4-T, to talk to the System-on-Chip (SoC). But those memory modules will still use the same physical interface and are ultimately able to occupy the same memory channel as DRAM memory modules. It would hence for example be possible to construct a memory channel where a memory controller communicates with one or more DRAM memory modules and more or more SCM memory modules. Accordingly, these different types of memories may coexist on the same memory channel, and thus on the same data bus, but on different memory modules within that memory channel.

With these emerging technologies, the inventors realised that this provides a number of options as to how the memories are organised and managed. For example, it would be possible to arrange for one of the first and second memory modules to be used as a cache for data stored in the other one of the first and second memory modules. For instance, if we consider the particular example above of a DRAM memory module and an SCM memory module, it may be desirable to treat the DRAM memory module as a cache for the typically larger, cheaper and slower SCM memory module. When adopting such an approach, data will inevitably have to move between DRAM and SCM, for cache linefills, and writebacks. In such an approach, the use of the direct data transfer technique of the described embodiments can give rise to significant benefits in terms of reduced latency, reduced power consumption and improved efficiency.

However, the direct data transfer techniques of the described embodiments are not limited to use in such situations. As another example use case, it can be desirable to provide for in-field replacement of memory modules, so that when a memory module is identified to be failing, data can be copied to a backup memory module. Using existing techniques, this requires the data to be read back to the memory controller, from where it is subsequently output via suitable write commands to the backup memory module. However, when using the direct data transfer technique of the described embodiments, the process could be performed much more efficiently using a direct memory module to memory module transfer, thus saving both system bandwidth and reducing margin required for detection of failure. In particular, the process is ideally performed with minimal loss of service to the system and in minimal time to pre-empt total memory module failure. Due to the significant reduction in time required to perform the in-field replacement when using the direct data transfer technique, the margin that is used to trigger the in-field replacement can be reduced.

In one embodiment where one of the memory modules is used as a cache for the other memory module, the apparatus may further comprise a cache controller to control use of the one of the first and second memory modules as a cache, the cache controller being arranged to apply a cache allocation policy, and to issue at least one transfer access request to the memory controller when the cache allocation policy indicates that a block of data should be transferred between the first and second memory modules. Hence, the cache controller can insert transfer access requests into the series of requests received by the memory controller as and when needed, in order to cause data to be transferred between the memory modules as required.

The direct data transfer may take a variety of forms, and hence for example may in one embodiment comprise a data move operation, whilst in another embodiment it may comprise a data copy operation (i.e. where the source data is left in place within the first memory module whilst a copy is stored within the second memory module).

In accordance with one embodiment, there is provided an apparatus comprising: a memory controller; a plurality of memory modules; and a communications infrastructure interconnecting the memory controller and the plurality of memory modules; the memory controller having a shared interface to communicate with the plurality of memory modules; the memory controller controlling direct data transfer between a first memory module and a second memory module of the plurality of memory modules, by issuing at least one direct transfer command via the shared interface, and the first memory module and the second memory module operating in response to the at least one direct transfer command so as to cause target data to be transferred over the communications infrastructure between the first memory module and the second memory module without the target data being routed via the memory controller.

It will be appreciated that the memory controller and various memory modules employed within an apparatus as described above may be manufactured and sold separately. The memory controller will be configured to be able to transmit the earlier-mentioned first direct transfer command and the second direct transfer command, in order to cause the first and second memory modules to coordinate their activities so as to transfer data directly between them, hence allowing the memory controller to still orchestrate the data transfer, but with the data itself bypassing the memory controller, thus enabling a reduction in the bandwidth requirements, an increase in performance, etc.

In one embodiment, the memory controller has a shared interface to communicate with a plurality of memory modules via a communications infrastructure, and also includes direct transfer control circuitry to control the direct data transfer between the first memory module and the second memory module by causing the required first and second direct transfer commands to be issued via the shared interface. The direct transfer control circuitry is responsive to a transfer access request received by the memory controller that requires data to be transferred between the first and second memory modules, to control generation of the first and second direct transfer commands required in order to cause the direct data transfer to be performed, rather than requiring the data to be returned to the memory controller for onward propagation to the second memory module.

The individual memory modules may be configured so that they can operate either as a source or as a destination for the above described direct data transfer, and hence be responsive to both the first direct transfer command and the second direct transfer command. Alternatively, some memory modules may be constructed so that they always act as the source during a direct data transfer, or always act as a destination during a direct data transfer. Each memory module may comprise direct transfer handling circuitry arranged to perform at least one operation to ensure compliance of the direct data transfer with communication protocol rules of the communications infrastructure interconnecting the memory module with the memory controller and one or more additional memory modules.

Each memory module may consist of a plurality of separate memory devices (also referred to as memory chips). Whilst in some embodiments the direct transfer handling circuitry may be provided centrally for use by all such memory devices, in an alternative embodiment the functionality of the direct transfer handling circuitry may be distributed, so that that direct transfer handling circuitry effectively comprises a separate direct transfer handling component for each of the memory devices.

Particular embodiments will now be described with reference to the Figures.

FIG. 1 is a block diagram of a data processing system in accordance with one embodiment. As shown, a number of requesting devices 10, 15, 20 (also known as request sources) issue access requests in respect of data held in a portion of memory 40. The requesting devices can take a variety of forms, and hence for example may comprise a central processing unit (CPU), a graphics processing unit (GPU), a cache, etc. The portion of memory 40 has a memory controller 30 associated therewith that is arranged to receive the various access requests from the requesting devices 10, 15, 20, and to then schedule those access requests for processing within the memory 40. The access requests are issued from the memory controller 30 to the memory 40 via an intervening physical layer interface 35. It is often the case that the memory 40 is provided off-chip, and the physical connection between the memory controller 30 and the memory 40 may often comprise multiple relatively long wires that may need to be used to provide a high speed, parallel interface. The physical layer interface 35 may employ mechanisms to maintain synchronous communication at high speed over those connection wires in order to ensure that a high speed, parallel interface can be achieved.

There are a number of ways in which the requesting devices 10, 15, 20 may be coupled with the memory controller 30, but in the arrangement shown in FIG. 1 it is assumed that there is an intervening interconnect structure 25 via which the requesting devices communicate with the memory controller 30. In addition to providing the routing interface for interconnecting the various requesting devices with the memory controller, and indeed with any other slave devices connected to the interconnect 25, the interconnect can also incorporate other functionality. For example, it may implement a cache coherency protocol to ensure that the contents of various caches within the system are kept coherent. These caches may include caches that are provided locally in association with each of the requesting devices 10, 15, 20, as well as other shared caches, such as at least one level of cache provided within the interconnect 25.

The portion of memory 40 can take a variety of forms, but in one embodiment consists of a plurality of memory modules 42, 44, which may for example take the form of dual in-line memory modules (DIMMs). Each DIMM may contain a plurality of separate memory devices (also referred to herein as memory chips).

Whilst in one embodiment a single memory controller 30 may control the entire memory, in some embodiments the memory is partitioned into multiple parts, with each part having an associated separate memory controller and associated physical layer interface. As shown in FIG. 1, the memory may for example be partitioned into multiple channels, connected to memories 40, 55, with each channel having a separate memory controller 30, 45 and associated physical layer interface 35, 50. The other memory controller 45 and physical layer interface 50 will be constructed in the same way as the memory controller 30 and physical layer interface 35, more details of which will be discussed later with reference to FIG. 4.

In one embodiment, the various requesting devices 10, 15, 20, the interconnect 25, and the memory controllers 30, 45 may all be provided within a System-on-Chip (SoC). The physical layer interface 35, 50 may in one embodiment also be provided on-chip, or may be provided off-chip at the interface with the memory controller 30, 45. In one embodiment, the portions of memory 40, 55 are provided off-chip and connected via connection wires with the physical layer interface 35, 50.

Typically there will be an on-chip communication protocol used for communications routed between the various components. In one embodiment the protocol used on-chip may be different to the protocol used for communication with the portion of memory, which is illustrated schematically in FIG. 1 with reference to the various interconnections. For example, the on-chip communication protocol may have at least one channel over which a request can be issued from the requesting devices 10, 15, 20, with separate write data and read data channels for the propagation of write data and read data. The request channel may in fact comprise one or more separate channels, for example a separate write address channel and a separate read address channel. A response channel may also be provided for routing responses back to the requesting device. The response data can take a variety of forms, and may include for example an acknowledgement signal to acknowledge that a write request has been accepted for processing. The response channel can also be used to indicate when particular access requests have failed for certain reasons.

In one particular example embodiment, the on-chip communication protocol may be the AMBA eXtensible Interface (AXI) protocol developed by ARM Limited, Cambridge, United Kingdom.

The memory controller 30, 45 will in one embodiment not only handle the scheduling of the pending access requests, but also perform protocol conversion to convert from the on-chip communication protocol to the communication protocol used to communicate with the off-chip portions of memory 40, 55. The communication protocol used to communicate with the memory modules will depend on the type of memory used for those memory modules, but in general may require the issuance of a series of commands of different types over a command propagation path, along with the propagation of write and read data over a data path.

Figure 2:
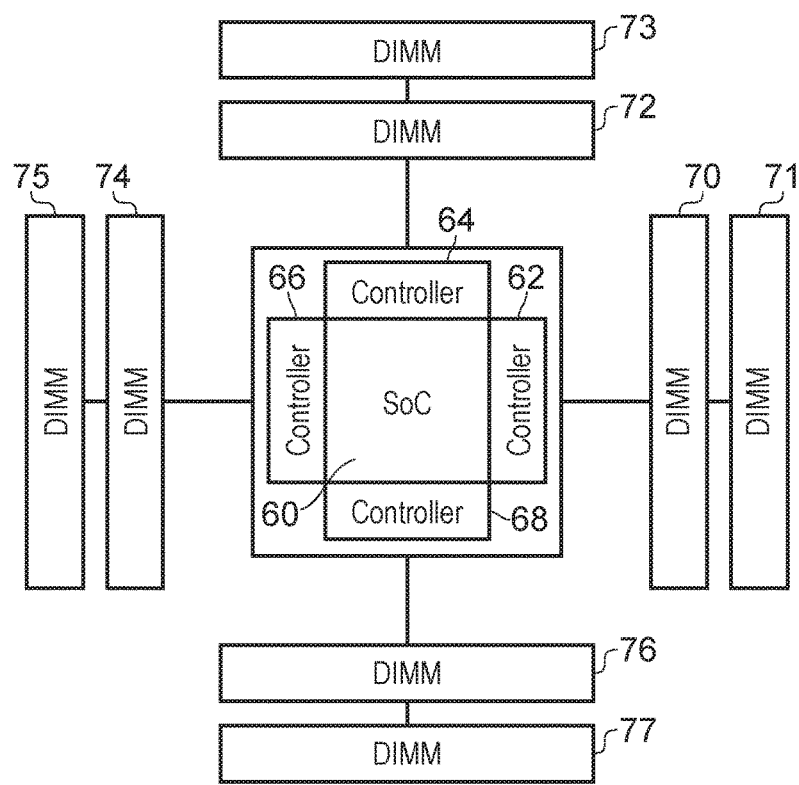
FIG. 2 illustrates a system in accordance with one embodiment that is provided with a plurality of memory controllers, each controlling an associated channel of memory.

FIG. 2 schematically illustrates an arrangement whereby a SoC 60 has four memory controllers 62, 64, 66, 68 associated therewith, in this example the associated physical interfaces being omitted for clarity. Each memory controller is provided for a separate memory channel to which a plurality of dual in-line memory modules (DIMMs) are connected. Hence, the DIMMs 70, 71 are connected to a first memory channel, the DIMMs 72, 73 are connected to a second memory channel, the DIMMs 74, 75 are connected to a third memory channel, and the DIMMs 76, 77 are connected to a fourth memory channel.

The number of DIMMs connected to each channel may be varied dependent on embodiment, and hence in some embodiments more than two DIMMs may share the same channel. Further, the number of separate channels provided can vary dependent on embodiment.

In typical systems it is traditionally the case that all of the memory modules are essentially identical, and together form a uniform address space, potentially interleaved across the various channels and memory modules. Within such an environment, each memory controller processes read requests by reading data from the relevant memory module and providing that data to a request source, and processes write requests by outputting write data from a request source to the relevant memory module for storage therein. Which memory module is accessed will depend on the address specified by the request source.

However, the inventors realised that with emerging technologies there is likely to be a need to transfer data from one memory module to another. As an example, within each DIMM, the memory devices may be of the same form, but the memory used within each of the separate DIMMs need not be the same, and indeed within one DIMM the memory used may have a different characteristic than the memory used in another DIMM provided within the same memory channel. As a particular example, with the advent of Storage Class Memory (SCM), it would be possible for at least one of the DIMMs to be constructed using SCM, whilst at least one other of the DIMMs connected to the same memory controller is constructed using a different memory technology, such as traditional DRAM.

Accordingly, it is possible that the DIMMs sharing the same memory channel may have different memory characteristics, whether that be in terms of access performance, density, physical construction, persistency, etc. In such situations, it may be desirable to allow for data to be transferred from one DIMM to another. Using existing techniques, this would involve the memory controller issuing a read command to read data from one DIMM, and then, once that data is received by the memory controller, the memory controller would subsequently output a write command along with that data in order to cause that data to be written to a different DIMM.

As will be discussed in more detail with reference to the subsequent figures, the technique of the described embodiments aims to alleviate the latency and power consumption associated with such data transfers, by providing a mechanism which avoids needing to route the data through the memory controller, whilst allowing the memory controller to still orchestrate the data transfer.

Figure 3:
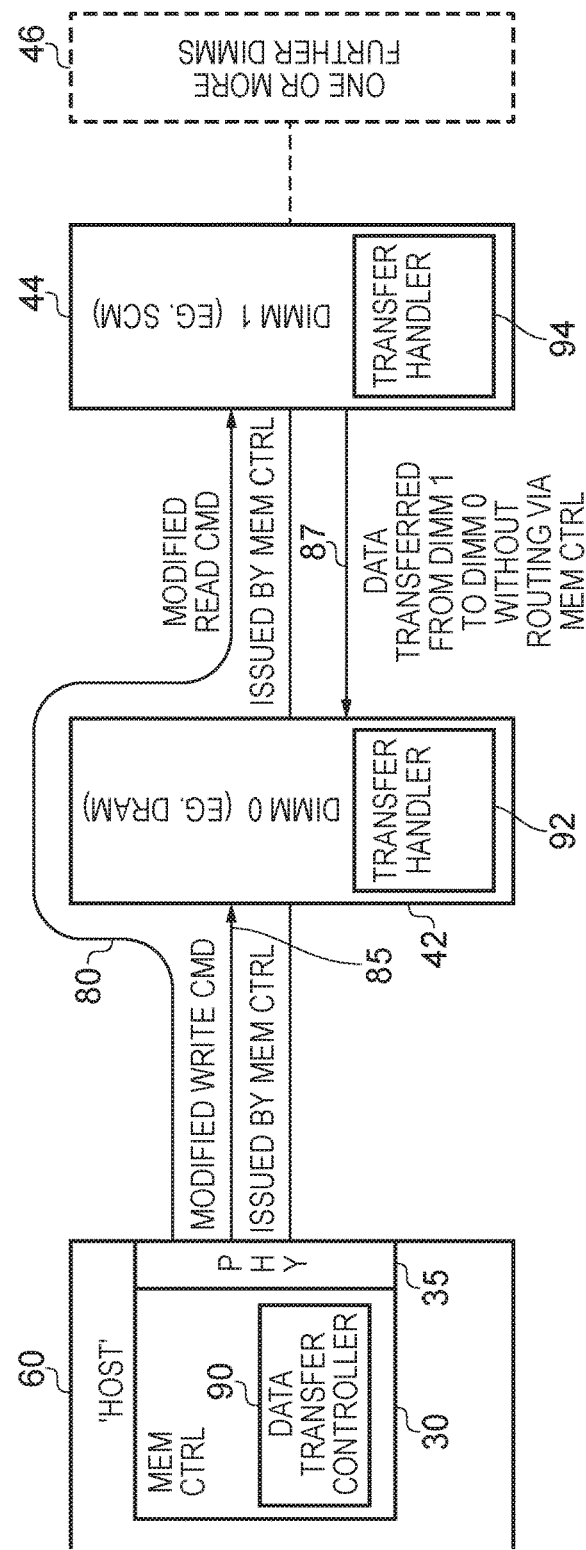
FIG. 3 schematically illustrates how modified read and write commands may be used in one embodiment in order to cause a direct data transfer between two memory modules within the same memory channel.

FIG. 3 is a diagram schematically illustrating a direct data transfer technique provided by the described embodiments. Within the SoC 60, any memory controller that is arranged to communicate over its memory channel with multiple DIMMs may be arranged to employ these techniques, in situations where there is a desire to allow data to be transferred from one DIMM to another. The direct data transfer may in one embodiment require data to be moved from a source DIMM to a destination DIMM, but in an alternative embodiment, rather than a strict move, a copy may be performed during the direct data transfer, so that the original data still resides in the source DIMM as well as being stored in the destination DIMM after the direct data transfer process has been completed.

As mentioned earlier, there may be a variety of reasons to wish to support such a data transfer, but it is expected that such transfer operations will be particularly useful in systems where individual DIMMs within the same memory channel may have different memory characteristics. This could for example allow one relatively small, fast access, DIMM to be used as a cache for another larger, slower access, DIMM.

In the example shown in FIG. 3, it is assumed that the memory controller 30 within the SoC 60 is arranged via its associated physical layer interface 35 to communicate with multiple DIMMs 42, 44, 46 sharing the same memory channel. It is further assumed that at least DIMM 0 42 has a different memory characteristic than DIMM 1 44, in the particular example shown it being assumed that DIMM 0 is constructed from DRAM memory whilst DIMM 1 is constructed from SCM memory. In addition to supporting usual read and write operations where the memory controller reads data from one of the DIMMs, or writes data to one of the DIMMs, a direct data transfer mechanism is supported under control of a data transfer controller 90 provided within the memory controller 30. When it is determined a direct data transfer is to be performed, one or more direct transfer commands can be issued by the memory controller to cause data to be routed between different DIMMs within the same memory channel without that data being transferred via the memory controller 30 (which may also be referred to as the "host"). The direct transfer commands can take a variety of forms, and indeed in one embodiment a single command may be broadcast to both of the relevant DIMMs providing sufficient information for each of the DIMMs to coordinate their activities so as to cause data to be transferred from one to the other without being routed via the memory controller. However, in one particular embodiment, the direct transfer commands take the form of a modified read command and a modified write command. In particular, a modified read command can be routed from the memory controller 30 to the DIMM that is to act as the source DIMM for the transfer, as indicated by the arrow 80 shown in FIG. 3. For the purposes of the described embodiments, the actual communications infrastructure via which the memory controller communicates with the DIMMs can take a variety of forms, and hence whilst in one embodiment a modified read command may be able to be sent straight to the DIMM 1 44, in an alternative embodiment it may be propagated over a path that routes through the input and output pins of DIMM 0 42.

In addition to the modified read command sent to the DIMM that is acting as a source DIMM for the transfer, in this example DIMM 1 44, a modified write command is also issued by the memory controller to the DIMM acting as the destination DIMM for the transfer, in this example the DIMM 0 42, as indicated by the arrow 85 in FIG. 3.

The modified read and write commands comprise information sufficient to cause the source and destination DIMMs to coordinate their activities such that the data read by the source DIMM and output on to the communications infrastructure is received by the destination DIMM 42, thereby avoiding the need for the data to first be returned to the memory controller for subsequent output to the destination DIMM as part of a separate later write command. However, the memory controller 30 still orchestrates the data transfer. In particular, the modified read command and modified write command will cause the source and destination DIMMs 44, 42 to operate somewhat differently to how they would operate in response to normal read and write commands. The use of the modified read and write commands will cause relative timing to be managed between the performance of the read operation by the source DIMM and the performance of the write operation by the destination DIMM to thereby ensure that by the time the destination DIMM performs the write operation, the data that it is required to store is being presented on the communications infrastructure from the source DIMM. The relative timing may be encoded directly within the modified read command and the modified write command, or alternatively that relative timing may be encoded in advance, through programming of an appropriate mode register 48 (shown in FIG. 1) accessible to the memory modules when processing the modified write and modified read commands.

For example, the relative timing information may specify a delay between receipt of a modified read command, and the outputting of the read data on the communications infrastructure, and similarly may identify a delay between receipt of a modified write command, and the performance of the write operation. The memory controller can then coordinate the timing at which it issues the modified read command and the modified write command, so that the relative timing of the read and write activities performed by the source and destination memory modules is such that at the time the destination memory module is seeking to perform its write operation, the required data is presented on the communications infrastructure by the source memory module.

A data transfer controller 90 may be provided within the memory controller to control use of the modified read and modified write commands. In particular, the system shown in FIG. 1 may be arranged so that the memory controller 30 can receive not only normal read and write requests from the interconnect, but can also receive at its input interface transfer commands. In particular, the system may be aware of the address space associated with the memory channel managed by the memory controller 30, and when the source and destination addresses are within that address space, a transfer request may be issued. The data transfer controller 90 within the memory controller can then evaluate such a transfer access request in order to determine whether the source and destination addresses are actually within different DIMMs of the memory channel. If not, the transfer request can be deconstructed into a sequence of normal read and write commands, in order to cause the data to be read into the memory module, and then subsequently written back to a different address within the relevant memory module. However, if the source and destination addresses are within different memory modules, then the direct transfer mechanism can be invoked, where the data transfer controller 90 instead deconstructs the move request into a sequence of modified read and modified write commands so as to allow the data to be routed directly between the memory modules without having to be returned via the memory controller. This can give rise to significant bandwidth and power consumption improvements.

In addition to the relative timing of the operations performed by the source and destination DIMMs being controlled in dependence on the use of the modified read and write commands, the modified read and write commands can also cause one or both of the source and destination DIMMs to perform various other operations aimed at ensuring compliance of the direct data transfer with the communication protocol rules of the communications infrastructure. Normally, the memory controller could directly ensure compliance with those rules, but given that the memory controller, whilst still orchestrating the data transfer, does not itself handle the actual transfer of the data, it is useful to devolve certain operations to the DIMMs themselves in order to ensure compliance of the direct data transfer with the communication protocol rules.

In particular, as shown in FIG. 3, each of the DIMMs 42, 44 may be provided with transfer handler circuitry to perform one or more operations when processing modified read and modified write commands. As will be discussed in more detail later, these operations can take a variety of forms. For example, the recipient of a modified read command may be arranged to generate a cyclic redundancy check (CRC) code to output with the data on the communications infrastructure, so that the CRC code could be referred to by the destination DIMM when writing the data.

Further, the DIMMs may be arranged to perform certain on-die termination (ODT) operations in order to appropriately set termination resistance for impedance matching purposes, having regard to the path being taken by the data, and in particular to take account of the fact that the data is being routed directly between the DIMMs rather than via the memory controller. As a further example, various physical layer training operations can be instigated by the transfer handling circuitry 92, 94 within the DIMMs, in addition to any physical layer training operations that may continue to be managed by the memory controller 30.

Whilst in FIG. 3 it is assumed that DIMM 1 44 is the source and DIMM 0 42 is the destination, it will be appreciated that in an alternative situation those roles may be reversed, enabling data to be moved in either direction between the two DIMMs as and when required.

Further, when more than two DIMMs are provided within the same memory channel, it will be appreciated that any one of them may be used as a source and any one of them may be used as a destination for a direct data transfer, as appropriate. Hence, data could for example be transferred via a direct data transfer process, between DIMMs 42 and 46 shown in FIG. 3. The actual physical arrangement of the wiring providing the communications infrastructure of the memory channel can be varied dependent on embodiment. Hence, whilst a direct path may be provided between the source and destination DIMMs, this is not a requirement, provided that the communications infrastructure is capable of allowing the data to be propagated from the source DIMM to the destination DIMM without being routed back via the memory controller. Thus, provided that the memory controller can be bypassed during the transfer of data between the source and destination DIMMs, a direct data transfer approach can be employed. Considering the particular example of FIG. 3, if a direct data transfer is performed between the DIMM 42 and the DIMM 46, it may be that the communications infrastructure provides a direct path between the two DIMMs, or it may be that the data is routed through input and output pins of the intervening DIMM 44 during the performance of the direct data transfer. In any event, the destination DIMM receives its data directly from the source DIMM, rather than via the memory controller.

Figure 4:
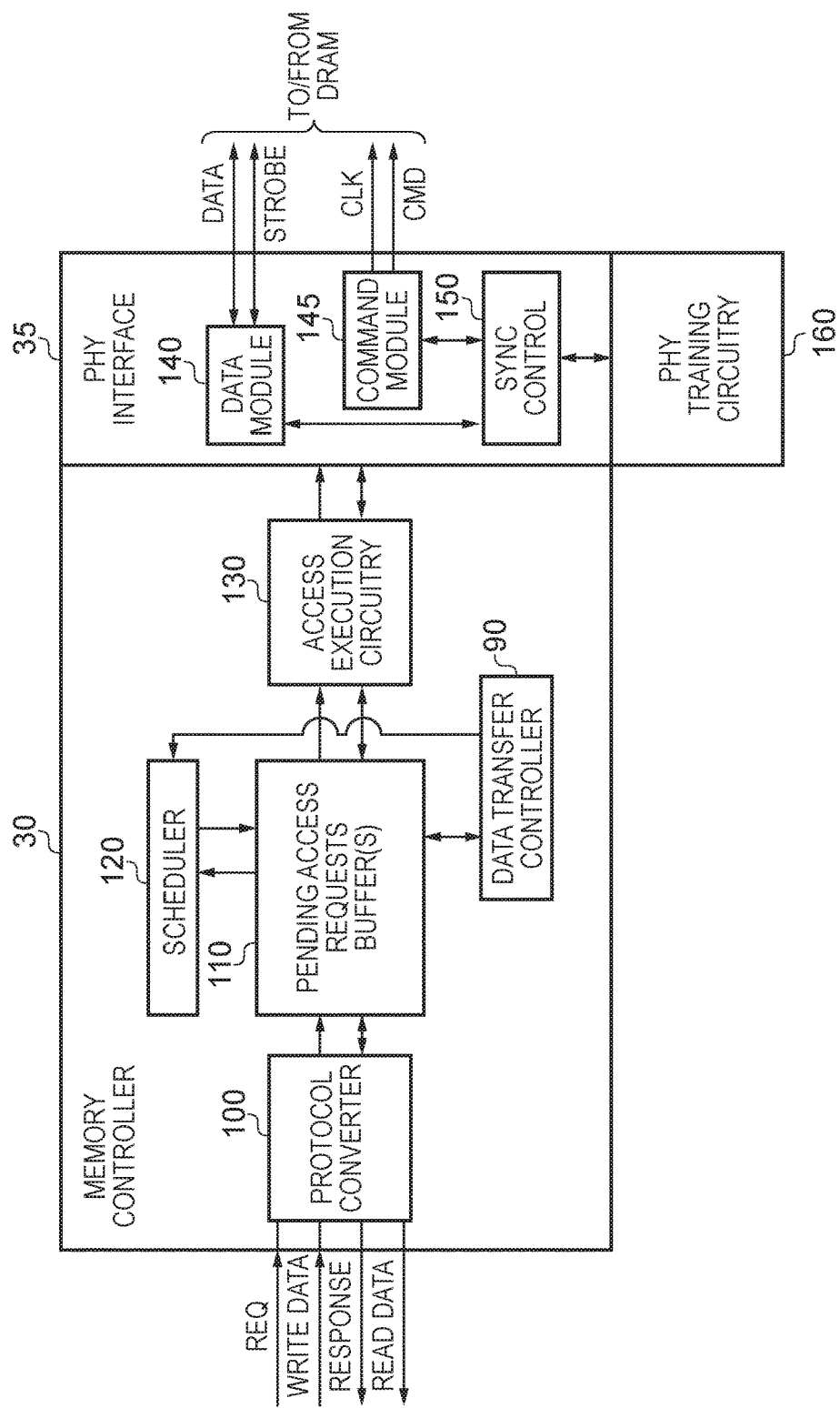
FIG. 4 is a block diagram illustrating in more detail the memory controller and physical layer interface of FIG. 1 in accordance with one embodiment.

FIG. 4 is a block diagram illustrating in more detail components provided within the memory controller 30 and the physical layer interface 35 in accordance with one embodiment. The memory controller 30 includes a protocol converter 100 for converting between the communication protocol used over the interconnect 25 (FIG. 1) and the protocol (or protocols) to be used for communicating with the various memory modules forming the portion of memory 40. As each request is received, it is converted and then placed into a pending access requests buffer, or buffers, 110. Each pending access request in the buffer will identify the address to be accessed, along with associated information such as the type of access to be performed. In the event of a write request, the write data can also be buffered in the pending access request buffer(s).

A scheduler circuit 120 is used to perform scheduling operations with respect to the contents of the pending access request buffer(s) in order to determine the order in which to issue the pending access requests to the portion of memory. This can take into account the structure and organisation of the portion of memory in order to seek to optimise the performance of the memory accesses. For example, when a particular page is open in DRAM memory, it is typically more efficient to continue to access the contents of that page rather than closing the page and opening another page.

Hence, pending access requests can be reordered by the scheduler with the aim of seeking to perform multiple accesses to an open page in the memory. Access execution circuitry 130 is used to issue selected access requests from the buffer 110 (as ordered by the scheduler 120) to the physical layer interface for onward propagation over the physical connection medium to the portion of memory 40.

The physical layer interface 35 includes a command module 145 for issuing the command signal which will identify the type of access and the address being accessed, and a data module 140 for outputting write data to the portion of memory, or for receiving read data from the portion of memory. In some embodiments, enable signals can be used in order to activate the relevant DIMM for any particular command.

A synchronisation control component 150 controls the operation of the command module and the data module in order to maintain synchronous communication over the physical connection between the physical layer interface 35 and the portion of memory 40. The synchronisation control block will include a number of circuits such as phase-lock-loop circuits and delay-lock-loop circuits that are configured to seek to take account of delays, both relative and absolute, in the paths between the physical layer interface and the portion of memory. In one embodiment, a clock signal is issued in association with the command signal from the command module to provide a timing reference, and a strobe signal is issued in association with the data signals to ensure that the data is latched on appropriate clock edges of the clock signal.

Over time, drift can be introduced into the signals propagating over the connection between the physical layer interface 35 and the portion of memory 40 due to a variety of factors, for example changes in operating temperature and voltage, etc. Hence, periodically a training operation may need to be performed on the physical layer interface 35 in order to update the configuration of the synchronisation control block 150 (to adjust phase delays and the like). Physical layer training circuitry 160 can be provided for performing such a training operation as and when required, and can apply a number of processes such as read/write levelling, data eye training, per-bit data deskew control, and PVT (process, voltage, temperature) compensation using any of a number of known techniques. The training circuitry 160 may initiate the training operation periodically, for example on lapse of a predetermined time period, or may be arranged to actively monitor the quality of the signals being communicated over the connection with the portion of memory so as to seek to detect when such drifting issues are reaching a point where there is an unacceptable probability that an error may soon occur. There are a number of properties in the signals that could be monitored, for example the signal to noise ratio on data capture. When a threshold is exceeded, then the training operation could be initiated.

Whenever the training operation is performed, it is necessary to stall performance of the pending access requests, and accordingly during the period in which the physical layer interface 35 is undergoing a training operation, no pending access requests will be issued from the access execution circuitry 130.

The training circuit 160 may be a dedicated hardware circuit used to perform the training operation, by communicating with the synchronisation control block 150 in order to issue a series of test commands to the memory, with the various signals being monitored in order to determine how best to adjust the various synchronisation control parameters maintained within the synchronisation control block 150. However, in an alternative embodiment, the training circuitry 160 may be implemented by a more general purpose processor executing firmware in order to perform the training operation.

As will be discussed in more detail later, in one embodiment the transfer handler circuitry provided within the DIMMs may also be arranged to perform certain physical layer training operations, and may have associated sync control circuitry to store the control values determined during such training operations. This enables effective training of the paths within the communications infrastructure used during direct data transfer between memory modules.

As shown in FIG. 4, the memory controller 30 includes the direct data transfer controller 90 discussed earlier with reference to FIG. 3. This has access in one embodiment to the pending access requests buffer or buffers, and can also communicate with the scheduler. As mentioned earlier, the requests received by the memory controller may include standard read and write requests, but can also include data transfer requests. The data transfer request may for example be used where the request source knows that the source and destination addresses are within the same address space associated with the memory channel controlled by the memory controller 30. The data transfer controller 90 in one embodiment monitors the contents of the pending access requests buffers in order to detect the presence of any such data transfer requests. It is then arranged to determine from the source and destination addresses specified by such a transfer request whether the source and destination addresses reside within different memory modules connected to the memory channel. If not, then the pending transfer requests can be broken down into a series of standard read and write requests that can then be processed by the access execution circuitry 130 issuing standard read and write commands via the physical interface 35 to the relevant memory modules. However, where it is determined that the source address and destination address reside within different memory modules, then the direct data transfer technique of the described embodiments can be used. In that event, the data transfer controller 90 can replace the data transfer request in the pending access request buffer with information that causes modified read and write commands to subsequently be issued to the relevant source and destination DIMMs. It can also pass information to the scheduler 120, so that the scheduler knows that those modified read and write commands need to be scheduled together, so that the required relative timing can be achieved.

Figure 5:
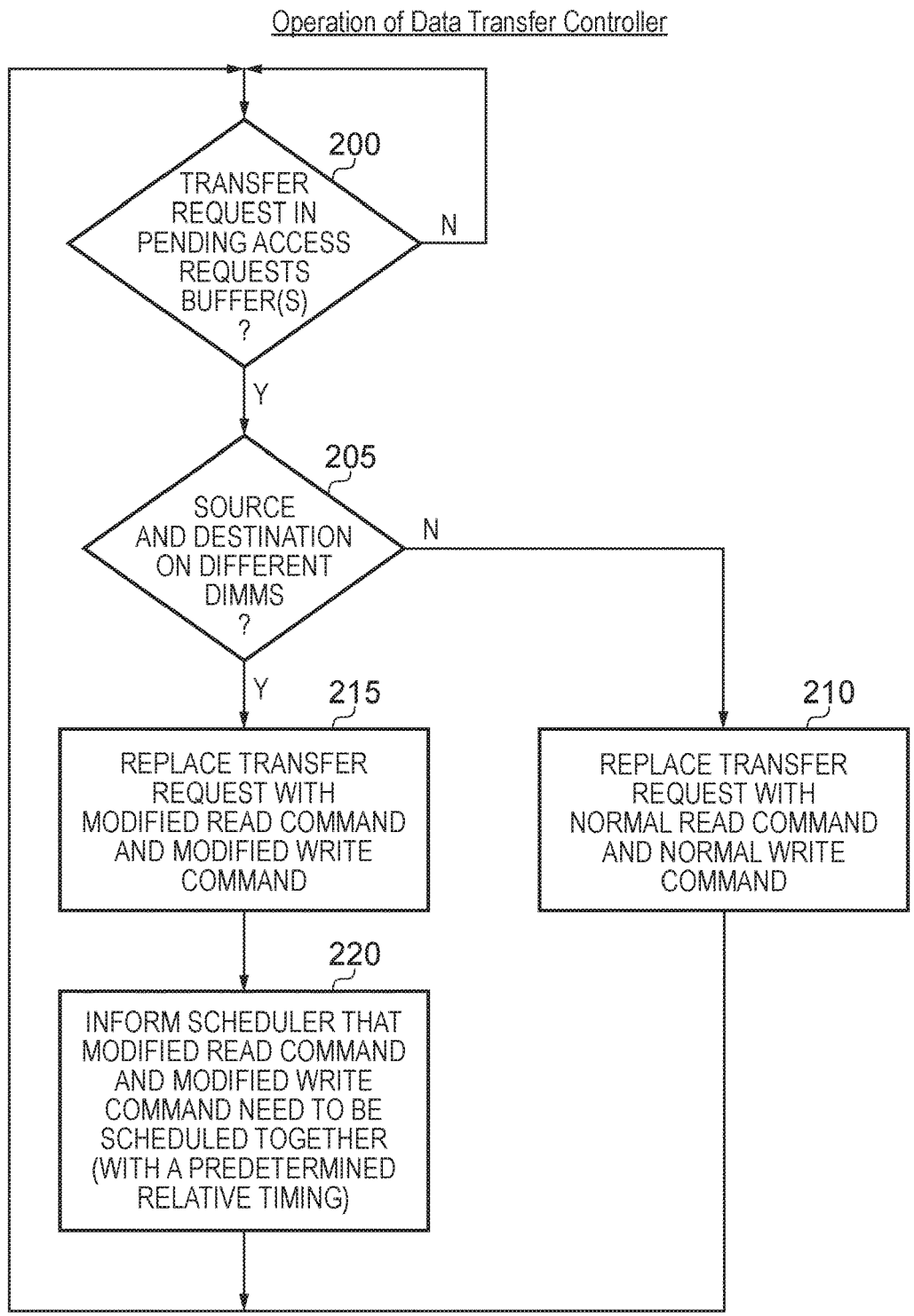
FIG. 5 is a flow diagram illustrating the operation of the data transfer controller of FIG. 4 in accordance with one embodiment.

FIG. 5 is a flow diagram illustrating the operation of the data transfer controller 90 of FIG. 4 in accordance with one embodiment. At step 200, the data transfer controller 90 determines whether a transfer request is present in the pending access requests buffer(s). When it is detected that such a transfer request exists, then at step 205 it is determined whether the source and destination addresses for that transfer request reside on different DIMMs. If not, then at step 210 the data transfer controller merely replaces the transfer request with normal read and write commands that can subsequently be issued by the access execution circuitry to the relevant memory modules within the memory 40. When processing those normal read and write commands, the read data will be routed back to the memory controller from where it will subsequently be issued in association with the write command to cause the data to be written to the destination address.

However, if at step 205 it is determined that the source and destination addresses are in different DIMMs, then at step 215 the data transfer controller 90 can replace the transfer request with modified read and write commands within the buffer(s) 110. In addition, at step 220, it will inform the scheduler that the modified read command and the modified write command need to be scheduled together, in order to ensure that a desired relative timing between those read and write commands occurs, so that the data output by the source DIMM onto the communications infrastructure will be present on the communications infrastructure at the correct time for it to then be received by the destination memory module whilst processing the modified write command.

The modified read and write commands can take a variety of forms, but an example format for each is illustrated schematically in FIGS. 6A and 6B. Considering first the modified read command as shown in FIG. 6A, one field 252 of the command 250 will provide an encoding indicating that the command is the modified read command. The modified read encoding in the field 252 may be a specific encoding for the modified read command, or alternatively may consist of the standard read command encoding, with an extra flag bit set to indicate that the read is a modified read, i.e. one that is used to implement a direct data transfer.

Another field 254 of the command 250 will provide an indication of the source address. As with normal read and write commands, certain control information can also be provided in a field 256 if desired, for example to identify if auto precharge is to be performed in order to close a memory page once the access is finished, to provide a burst chop indication to indicate whether a burst is to be split into multiple portions, etc. Additionally, in one embodiment an optional field 258 may provide an indication of an additive timing to be used, for example to identify the delay between receipt of the read command and the clock cycle in which the read data is to be output onto the communications infrastructure.

As shown in FIG. 6B, a modified write command 260 can take a very similar form. In particular, a field 262 can be used to indicate that the write command is a modified write command, either using a dedicated encoding indicating the modified write, or using a normal write encoding with an extra flag bit set, whilst an additional field 264 can provide the destination address. If desired, control information can also be provided in the field 266, which can be of a similar form to the control information 256 discussed with reference to FIG. 6A. Additionally, an additive timing field 268 can be provided if desired to indicate the timing delay between receipt of the write command and retrieving of the write data from the communications infrastructure.

Whilst in FIGS. 6A and 6B the modified read and write commands can directly encode the additive timing information in the fields 258, 268, in an alternative embodiment such additive timing information need not be specified on a command-by-command basis, and instead a mode register (such as the mode register 48 illustrated schematically in FIG. 1) can be programmed with the additive timing delays applicable for modified read and write commands, which the memory modules can refer to when processing the modified read and write commands.

Figure 7A:
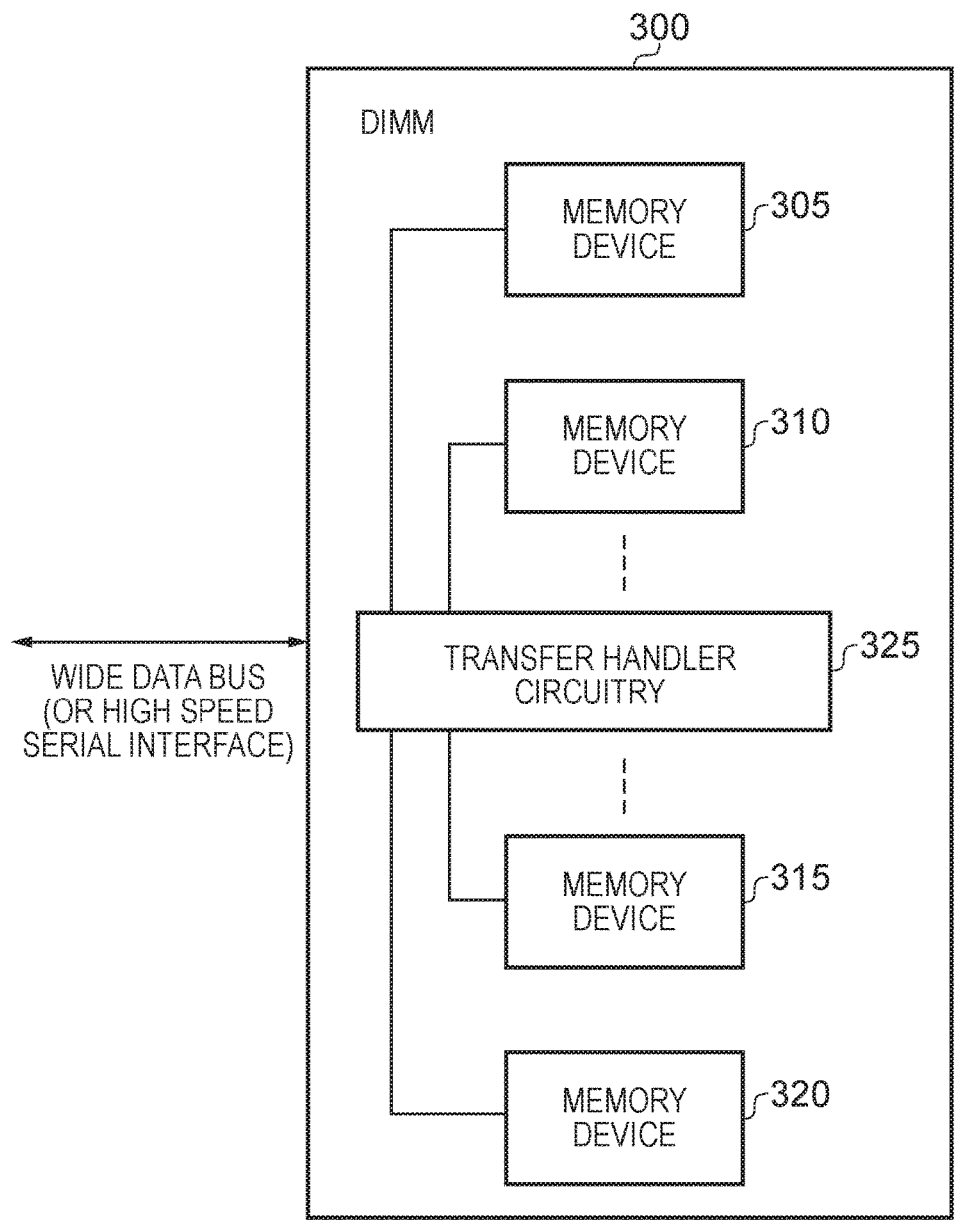
FIGS. 7A and 7B illustrate two alternative arrangements of components within a memory module that may be used in some embodiments.

The various DIMMs connected to the memory channel can take a variety of forms, but will typically consist of multiple memory devices (also referred to herein as chips) which collectively form the memory of the DIMM. FIG. 7A illustrates an example DIMM 300 consisting of a plurality of memory devices 305, 310, 315, 320. In this embodiment, centralised transfer handling circuitry 325 is provided for performing one or more operations that are triggered when handling modified read commands or modified write commands indicating a direct data transfer. These operations will be discussed in more detail later. The DIMM 300 may be connected to the memory controller and other DIMMs within the memory channel using a variety of different techniques. For example, a wide data bus may be provided for interfacing with the DIMM 300, or alternatively a high speed serial interface may be provided.

Figure 7B:
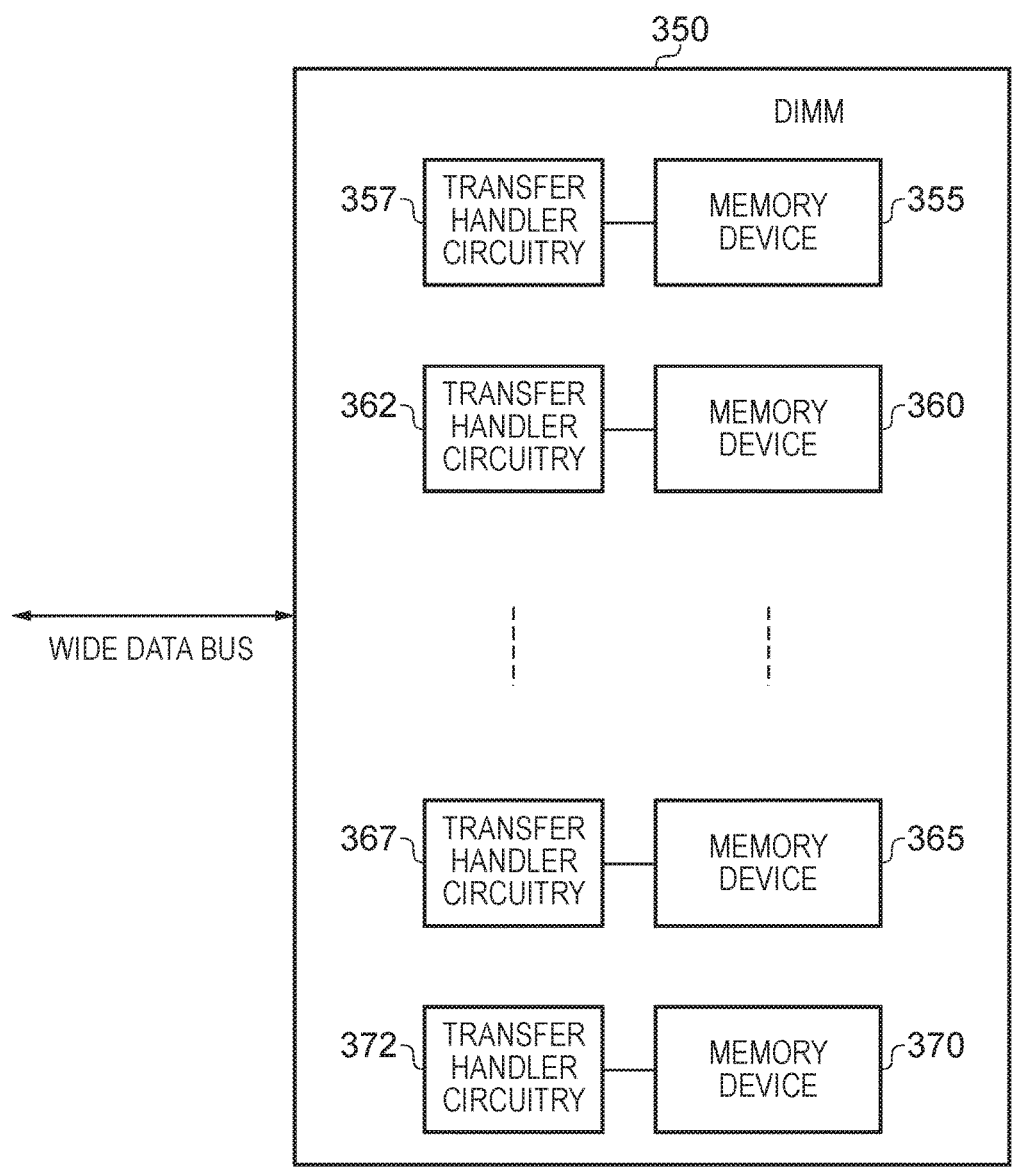

In embodiments where a wide data bus is used, then it is possible in an alternative configuration to distribute the transfer handling functionality amongst the separate memory devices, as illustrated in FIG. 7B. In this example, the DIMM 350 is made up of a plurality of memory devices 355, 360, 365, 370, each of which has associated transfer handling circuitry 357, 362, 367, 372. When employed in association with a wide data bus, the various wires forming the wide data bus may be routed to corresponding memory devices and associated transfer handling circuitry, and the need for a centralised transfer handling circuit may be avoided.

In a yet further alternative embodiment, a hybrid between the approaches of FIGS. 7A and 7B could be adopted, where certain of the operations associated with the transfer handling circuitry are distributed whilst others are performed centrally. For example, one of the operations performed by the transfer handling circuitry may involve generation of a CRC code during a read performed as a result of a modified read command, and that functionality could be distributed in accordance with the approach illustrated in FIG. 7B. Meanwhile, other operations, such as ODT setting operations to set termination resistors to appropriate values for impedance matching, could be performed centrally, as could physical layer training operations associated with each DIMM.

Figure 8:
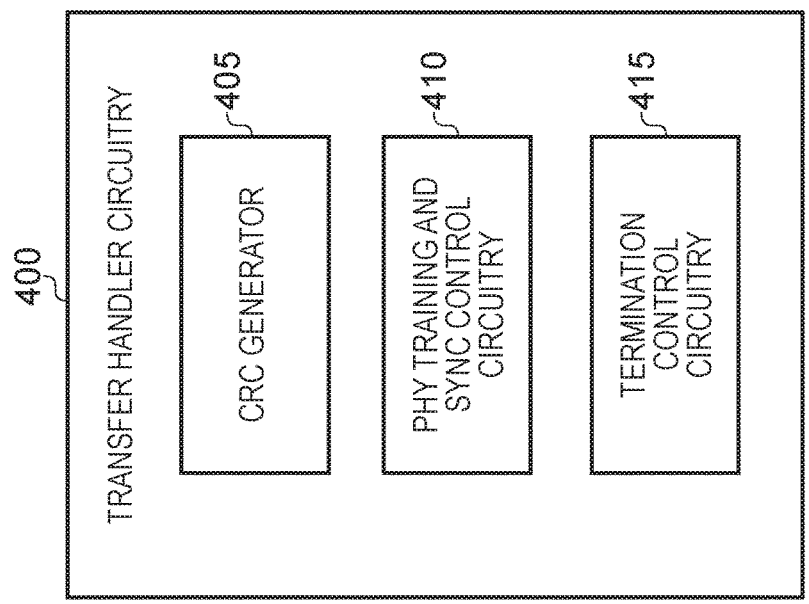
FIG. 8 is a block diagram illustrating components that may be provided within each transfer handler circuitry of FIG. 7A or FIG. 7B in accordance with one embodiment.

FIG. 8 schematically illustrates different functional components that can be provided within instances of the transfer handler circuitry shown in FIG. 7A or 7B. FIG. 8 shows the generic approach where each transfer handling circuitry includes the same components. In this example the transfer handling circuitry 400 includes a CRC generator 405 for generating CRC codes during read operations performed as part of processing modified read commands, a phy training and sync control circuitry 410 for performing certain physical layer training operations and maintaining synchronisation control values, and termination control circuitry 415 for performing a termination setting operation to configure termination components within the associated memory module to take account of whether the command being processed is implementing a direct data transfer, or instead is implementing a traditional data transfer between the memory controller and the memory module.

Figure 9:
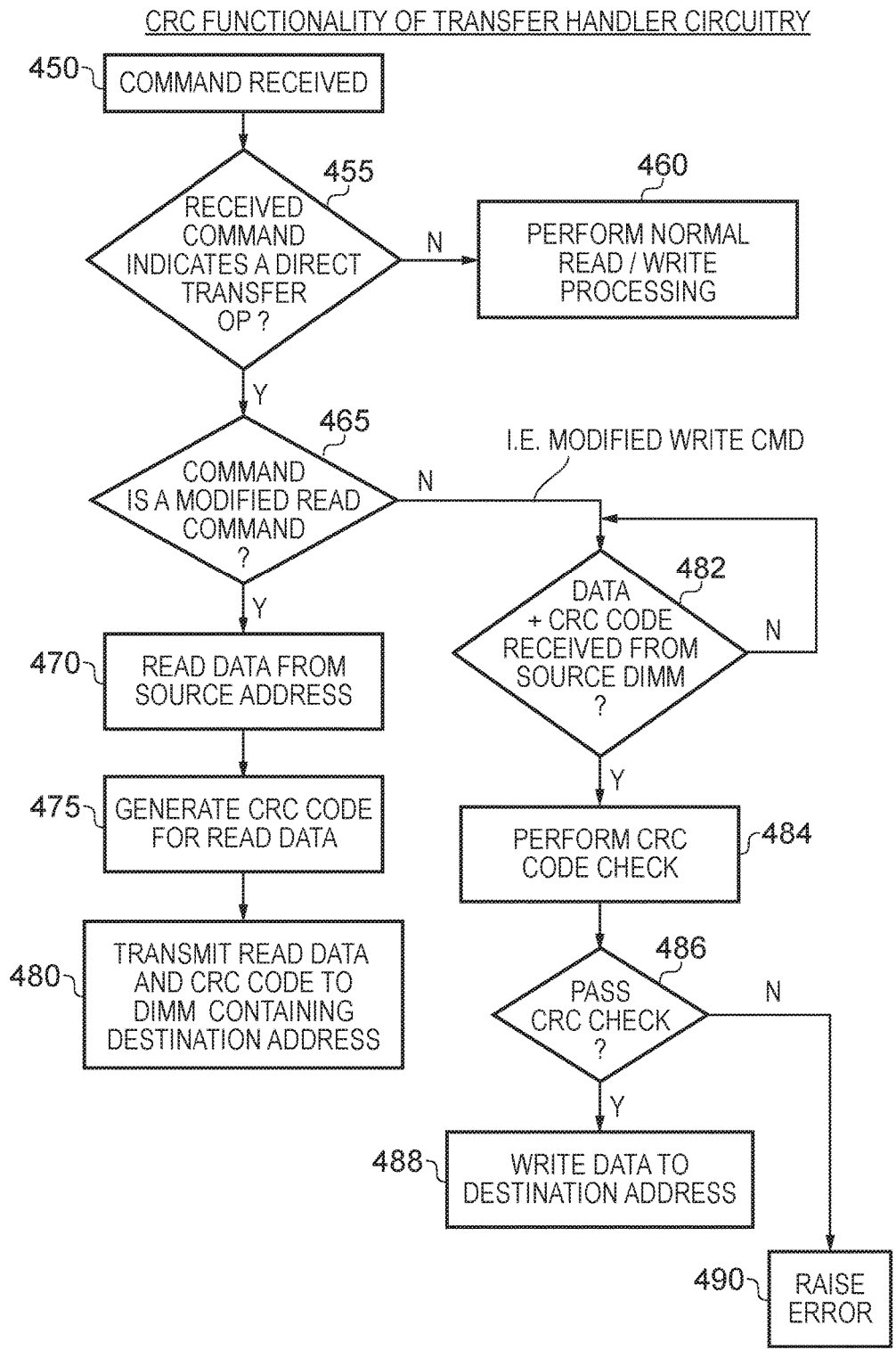
FIG. 9 is a flow diagram illustrating the operation of the cyclic redundancy check (CRC) generator of FIG. 8 in accordance with one embodiment.

FIG. 9 is a flow diagram illustrating the selective operation of the CRC generator 405 of FIG. 8 in accordance with one embodiment. At step 450, the DIMM receives a command. At this point, the DIMM (or the individual memory device within the DIMM where the CRC generation functionality is distributed as per the FIG. 7B approach) has determined that a command issued by the memory controller relates to it rather than to another DIMM or memory device. This determination can be achieved in a variety of ways dependent on implementation. In one embodiment, each command issued by the memory controller is associated with corresponding enable signals that cause the relevant DIMM and/or memory device to be enabled.

Once a command has been received, then at step 455 it is determined whether the received command indicates a direct data transfer operation, which in one embodiment can be determined from the form of the command received. For example, if a modified read command or a modified write command is received, then this indicates that a direct data transfer operation is required. If not, then at step 460 the DIMM performs normal read/write processing and the CRC generator is not required to perform any CRC code generation activity.

If at step 455 it is determined that the command does indicate a direct transfer operation, then at step 465 it is determined whether the command is one of the earlier mentioned modified read commands. If so, then the process proceeds to step 470 where the required read data is obtained from the source address, i.e. is read from the relevant memory device within the DIMM. In addition, the DIMM will refer to the required additive timing information, whether that is specified directly within the modified read command, or is specified in a particular mode register referred to by the DIMM when performing modified read operations, in order to determine when the read command needs processing, and in particular when the read data should be transmitted on to the communications infrastructure interconnecting the memory modules and memory controller.

Once the read data has been obtained, then at step 475 the CRC generator 405 generates a CRC code for the read data, whereafter at step 480 the read data is transmitted over the communications infrastructure during the clock cycle identified by the additive timing, so that that read data can then be obtained by the DIMM containing the destination address. That transmitted read data will also be accompanied by the generated CRC code. The time at which the CRC code is transmitted will vary dependent on embodiment, but in one embodiment may be transmitted in the clock cycle following the read data, with the destination DIMM then receiving the read data and subsequently receiving the CRC code so that it can perform a check as to the accuracy of the data obtained from the communications infrastructure.

If it is determined at step 465 that the command is not a modified read command, then in one embodiment this will mean that the command is a modified write command, and the process will proceed to step 482 where the destination DIMM processing the modified write command will await receipt of the data and associated CRC code from the source DIMM. Again, the required additive timing will be referred to in order to determine at what point the destination DIMM should expect to receive the data from the communications infrastructure interconnecting the source and destination DIMMs. Once the data and CRC code have been received, then at step 484 the destination DIMM will perform a CRC code check in order to then determine at step 486 whether the CRC check is passed or not. Assuming the check is passed, then the data is written to the destination address at step 488, otherwise an error is raised at step 490. The error may be raised in a variety of ways, but in one embodiment involves notifying the memory controller via an alert pin provided at the memory controller's interface. Such a signal will then for example cause the memory controller to seek to fix the problem that caused the data transmission to fail, for example by causing the relevant paths within the physical interface to be retrained, whereafter the data transfer can be retried.

Figure 10:
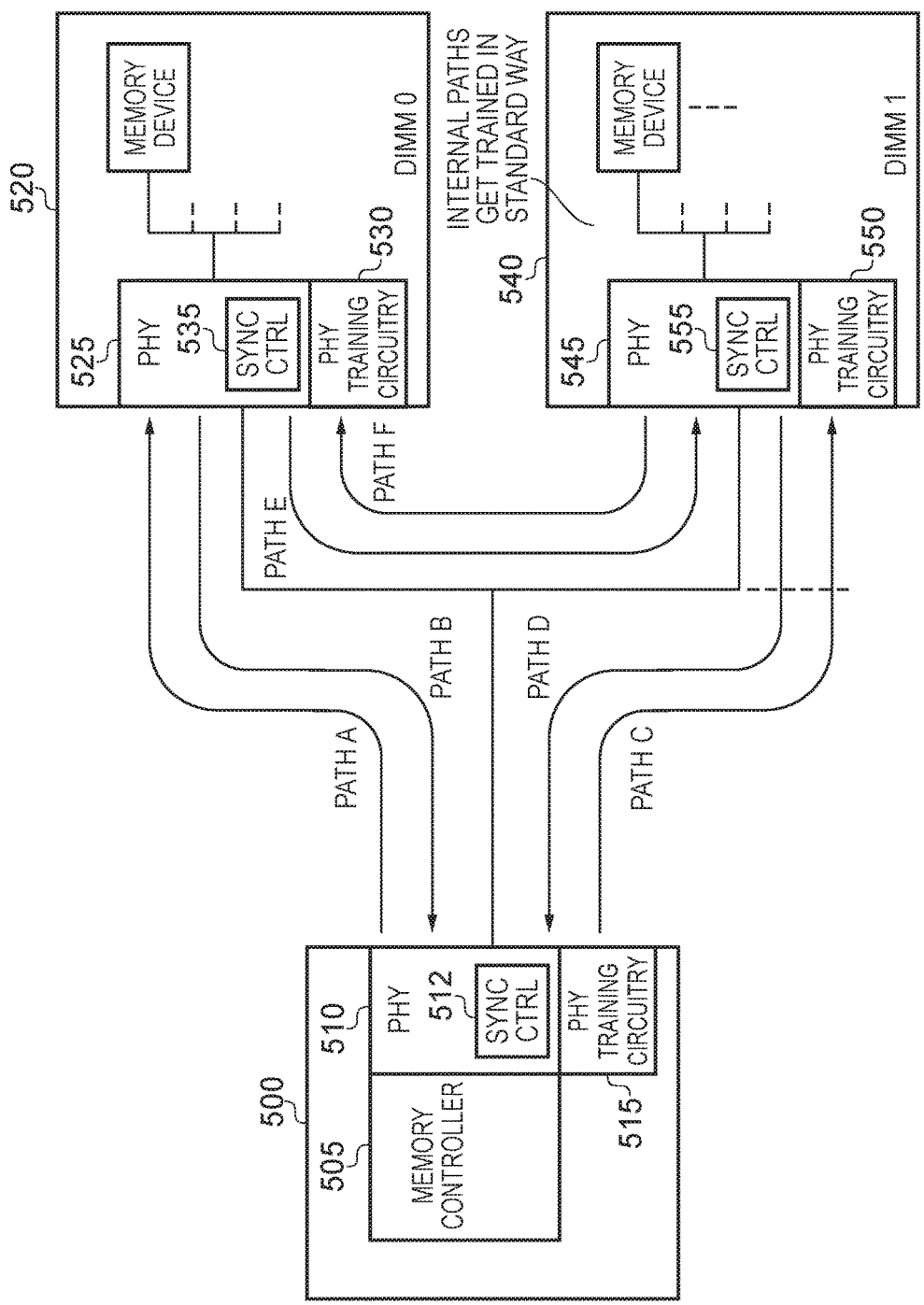
FIG. 10 is a block diagram schematically illustrating how the phy training and sync control circuitry provided within the memory modules may be used to perform training in respect of paths used for direct data transfer in accordance with one embodiment.

FIG. 10 is a diagram schematically illustrating how physical layer training components and associated synchronisation control components can be provided within the various DIMMs in one embodiment, in addition to the physical layer training circuitry and sync control circuitry provided in association with the memory controller, in order to enable paths used during direct data transfer to be subjected to training operations as and when required. In this example, a SoC 500 includes memory controller 505, associated physical layer interface 510 and sync control circuitry 512, along with physical layer training circuitry 515, which may for example be configured as discussed earlier with reference to FIG. 4. In this example, it is assumed that two DIMMs 520, 540 are provided within the associated memory channel. For ease of illustration, and in particular to show the various paths, these DIMMs are shown as being connected in parallel with the memory controller, but in one embodiment they may in fact be arranged in a serial manner, for example as illustrated schematically in FIG. 3. Each of the DIMMs also includes an associated physical layer interface. Hence, the DIMM 520 has a physical layer interface 525 and associated physical training circuitry 530, the physical layer interface including a sync control block 535. Similarly, the DIMM 540 includes a physical layer interface 545 with associated physical training circuitry 550, and a sync control block 555. As discussed earlier with reference to FIGS. 7A, 7B and 8, these additional components within the DIMMs can be considered to form part of the transfer handling circuitry. In the example shown in FIG. 10, it is assumed that the physical training and sync control functionality is retained centrally rather than being distributed to individual memory devices, but in an alternative embodiment it may be possible to distribute its functionality between the various memory devices.

The physical training circuitry and sync control blocks within the individual DIMMs operate in an analogous manner to the physical training circuitry 515 and sync control block 512 associated with the memory controller 505, and accordingly can perform the general functions discussed earlier when discussing FIG. 4. However, the physical training operations performed by the phy training circuitry 530, 550 are intended to complement the normal physical training functionality performed by the phy training circuitry 515 associated with the memory controller, so as to enable certain paths used for direct data transfer to be appropriately subjected to training operations. Hence, whilst the phy training circuitry 515 associated with the memory controller 505 can still retain primary responsibility for training the paths labelled as paths A, B, C and D in FIG. 10, the phy training circuits 530, 550 within the two DIMMs 520, 540 can be used to ensure correct training of the paths E and F via which data may be transferred between the DIMMs without being routed via the memory controller.

Whilst for ease of illustration FIG. 10 shows an arrangement with only two DIMMs connected to the memory controller, the same basic approach can be expanded to cover situations where more than two DIMMs are connected to the same memory channel, and hence where there are potentially more paths that may need to be subjected to physical layer training. Further, in FIG. 10 it is assumed that internal paths within each DIMM continue to be trained using standard techniques.

Figure 11:
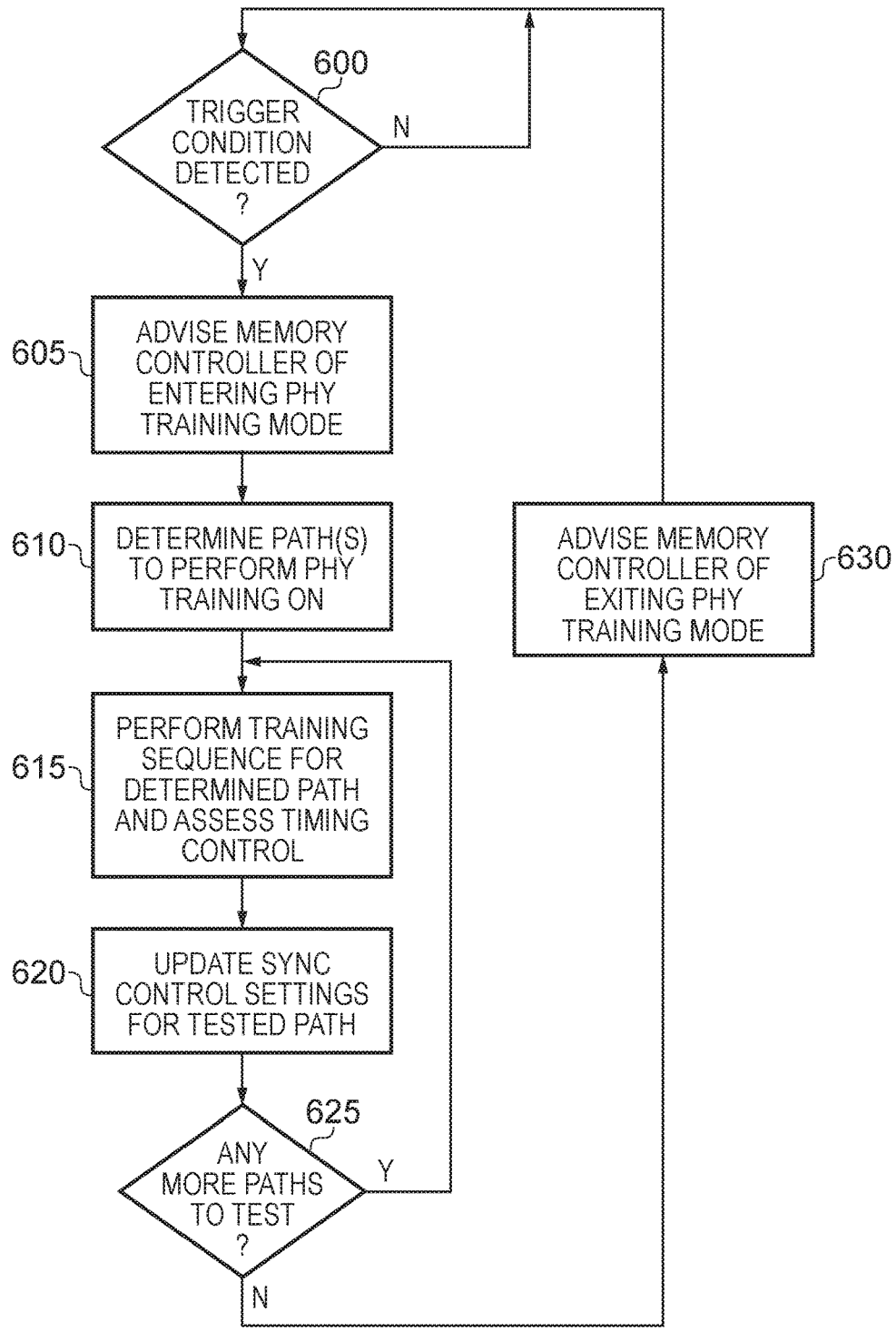
FIG. 11 is a flow diagram illustrating the operation of the phy training and sync control circuitry of FIG. 8 in accordance with one embodiment.

FIG. 11 is a flow diagram illustrating the phy training and sync control functionality that can be implemented by the transfer handling circuit components provided within the DIMMs 520, 540. At step 600, it is determined whether a trigger condition is detected that requires at least one path associated with the phy training circuitry to be trained. As mentioned earlier, this trigger could take a variety of forms. For example, the trigger may be caused by the lapse of a predetermined time period, or alternatively the physical training circuitry may be arranged to actively monitor the quality of signals communicated over the relevant connection paths so as to seek to detect when drifting issues and the like are reaching a point where there is an unacceptable probability that an error may soon occur. There are a number of properties and signals that could be monitored, for example the signal to noise ratio on data capture. When a threshold is exceeded, then the training operation could be initiated. As another alternative, the phy training circuitry 515 associated with the memory controller 505 may send a signal to the phy training circuits 530, 550 to trigger their training operations.

When the trigger condition is detected, then at step 605 the relevant phy training circuit advises the memory controller that it is entering the phy training mode. This causes the memory controller to temporarily suspend propagation of commands over the communications infrastructure so as to enable the training to take place.

At step 610 it is then determined which path or paths physical training needs to be performed upon. This may be directly determinable from the nature of the trigger condition, which as mentioned earlier could for example be associated with the signal quality on a particular path deteriorating to a threshold level, or could be specified in a variety of different ways.

Following a determination of the paths to be trained, then for a first path to be tested, a training sequence can be performed, at step 615, in order to cause a series of test commands to be issued over the relevant path, with the various signals being monitored in order to determine how best to adjust the various synchronisation control parameters maintained within the associated synchronisation control block. Accordingly as a result of performing the training sequence, the timing control parameters required to be maintained by the synchronisation control block can be assessed in step 615. Thereafter, at step 620 the synchronisation control settings are updated within the synchronisation control block for the associated tested path, whereafter at step 625, it is determined whether there are any more paths to test. If so, the process returns to step 615 to test the next path, whereas otherwise the process proceeds to step 630 where the memory controller is advised that the physical training mode is being exited, whereafter the process returns to step 600.

The exact form of the training sequences required will depend on the way in which the commands and associated data are propagated over the interconnecting wires between the memory controller and associated memory modules. In the example discussed earlier with reference to FIG. 4, a strobe is sent along with each byte of data, which in one embodiment may be a source synchronous strobe. The data and strobe are bidirectional signals and new data is provided concurrently with each edge of the strobe to ensure that all variations on the data path are also seen on the strobe path. In order to capture the data, the strobe needs to be delayed relative to the clock signal and used to latch the data into a register. By establishing the relationship between strobe and data, both static (process variation, package and board configuration induced) and dynamic variations (for example caused by system operating voltage and temperature fluctuations) can be minimised. The training sequence can be used to control the timing of the strobe in relation to the clock signal, and also the timing of the data with regard to the strobe signal. Whilst in a traditional system, only the SoC needs to manage the data and strobe relationship due to all communication paths routing through the memory controller, in accordance with the described embodiments, certain of that training functionality may be devolved to the individual DIMMs in order to support the earlier described direct data transfer.

The exact mechanisms employed within the physical training circuits associated with the DIMMs can vary dependent on embodiment. For example, considering modern DRAMs (e.g. DDR4), a "write levelling" mode is offered, which allows the DRAM device to measure the compensation required for flight-time skew between clock and strobe by feeding back the clock signal sampled using the strobe signal onto the data pins, thus allowing an iterative loop to adjust compensation until capture is aligned. Similarly, LRDIMMs (which buffer the data bus between the host and the DRAM) offer equivalent capability. This process requires the transmitter to send pulses on the strobe signals whilst not driving the data bus. To facilitate DIMM to DIMM communications as required by the above described direct data transfer, a new mode could be added to allow a DIMM to generate such pulses so that the receiver DIMM can be trained to the transmitter DIMM. In one embodiment, the memory controller could still be used to evaluate the data responses and adjust calibration settings during the training if desired. However, the evaluation mechanisms could also be moved to the DIMMs themselves. In such an embodiment, the memory controller could then be provided with the ability to train its strobe and data generation to match using a similar process.

As discussed earlier, another function that requires some modification to deal with the fact that during direct data transfer, data is communicated directly between DIMMS rather than via the memory controller, is that of ODT, which sets resistive values applied by termination components within the memory modules and the memory controller for impedance matching purposes. This can be used to improve signal integrity during data transfer. However, the termination settings required by the memory controller and the various memory modules connected to the same memory channel will vary dependent on whether normal read and write commands are being processed where data is moving between the memory controller and a memory module, or direct data transfer is being performed where data is moving between memory modules without being routed back through the memory controller.

Figure 12A:
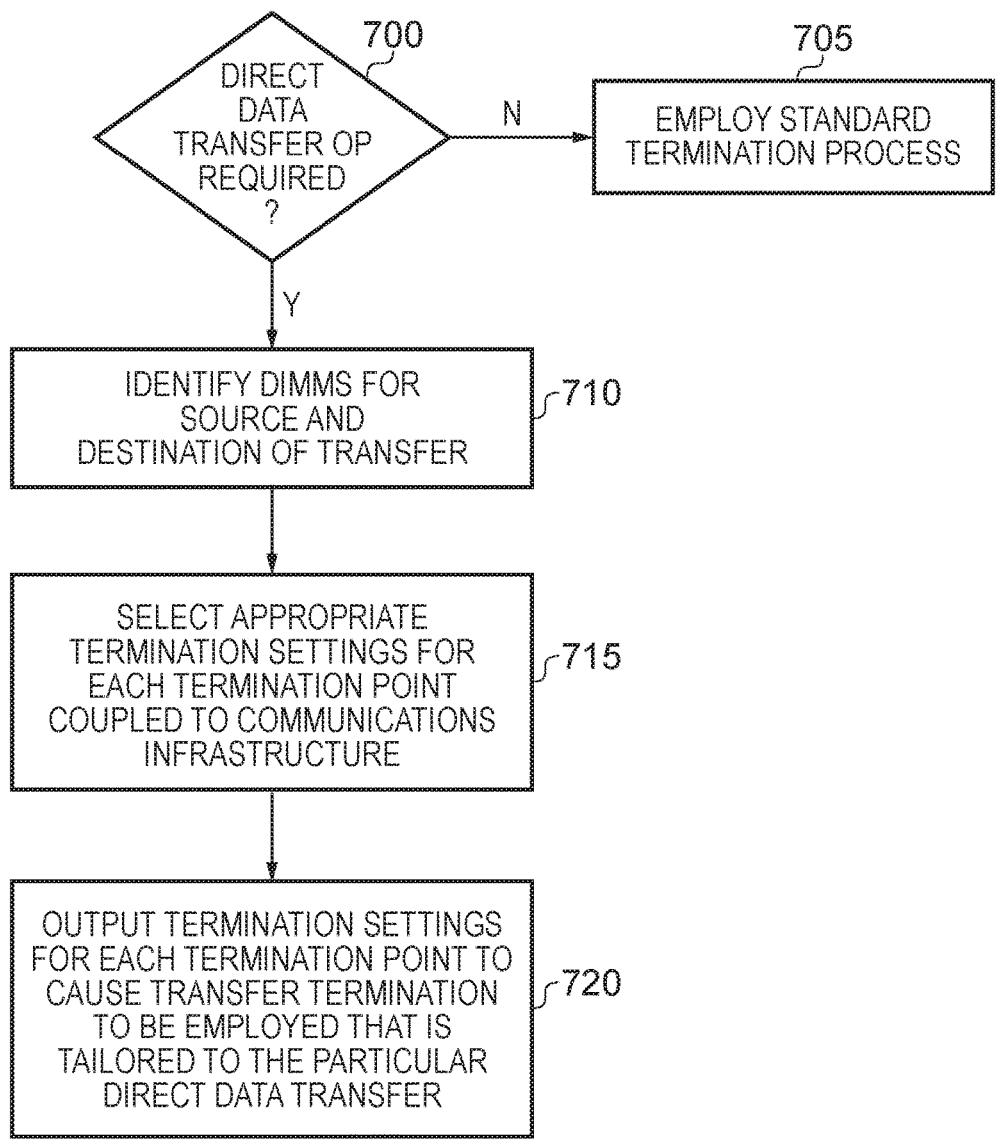
FIG. 12A is a flow diagram illustrating how transfer termination may be performed in accordance with one embodiment.

FIG. 12A is a flow diagram illustrating a centralised transfer termination approach that can be used in one embodiment, where the memory controller retains management of the termination setting process. At step 700, it is determined whether a direct data transfer operation is required, and if not, standard termination processes are employed by the memory controller at step 705 in order to cause appropriate termination settings to be established by each of the memory modules.

However, if at step 700 it is determined that a direct data transfer operation is required, then at step 710, the DIMMs forming the source and destination for the transfer are identified. Thereafter, at step 715 appropriate termination settings are selected for each termination point coupled to the communications infrastructure. It should be noted that the relevant termination points are in one embodiment not only the source and destination DIMMs, but also any other DIMMs and indeed the memory controller itself, since the termination settings of all of these components may need to be adjusted to take account of the direct data transfer taking place.

Following step 715, the termination settings are output for each termination point, in order to cause transfer termination to be employed that is tailored to the particular direct data transfer being performed.

Figure 12B:
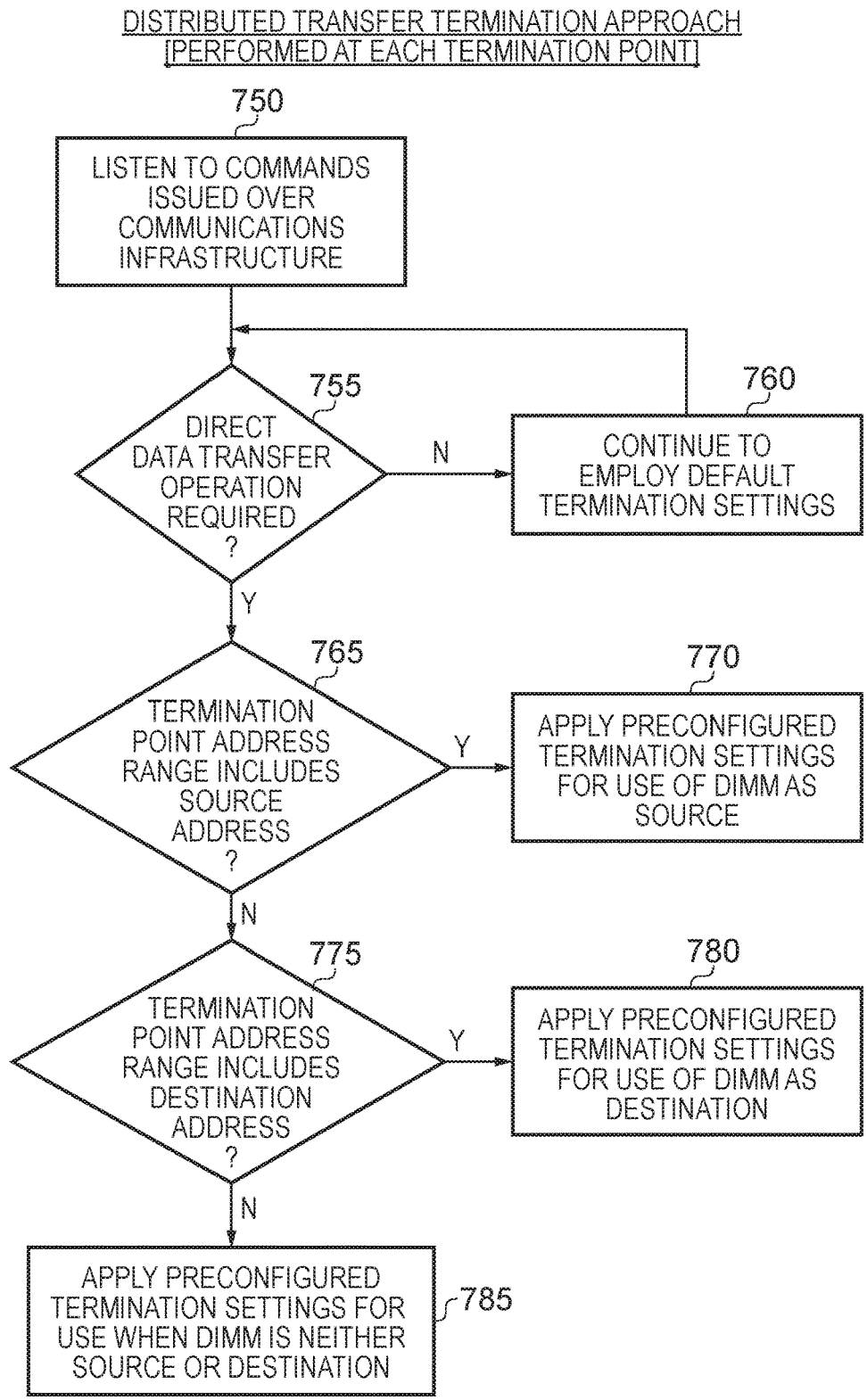
FIG. 12B is a flow diagram illustrating how transfer termination may be performed in accordance with an alternative embodiment.

FIG. 12B is a flow diagram illustrating a distributed transfer termination approach, where each of the termination points can employ techniques to determine the appropriate termination settings to use. At step 750, each termination point listens to the commands issued over the communications infrastructure. In one embodiment this means that an individual memory module not only looks at commands destined for it, but also commands being issued to other memory modules, since it may need to change its termination settings even if it is not being used as a source DIMM or a destination DIMM for a transfer. At step 755 the termination point determines whether a direct data transfer operation is required by the current command being propagated over the communications infrastructure. If not, then at step 760 it continues to employ default termination settings. These default termination settings may for example be pre-programmed by the memory controller for each of the DIMMs.

Once at step 755 it is determined that a direct data transfer operation is required, then the termination points determines, at step 765, whether the source address is within the address range serviced by that termination point. If so, then preconfigured termination settings are applied at step 770 that have been set up for use when the DIMM is acting as the source DIMM.

If the source address it not within the address range of the DIMM performing the process shown in FIG. 12B, then at step 775 it is determined whether the destination address is within the address range managed by the DIMM. If so, then again preconfigured termination settings are applied at step 780, these having been set for use when the DIMM is acting as a destination DIMM. It should be noted that the termination settings used at step 780 may be different than the termination settings used at step 770.

If it is determined at step 775 that the destination address is also not associated with the address range of the DIMM, then at step 785 the DIMM applies preconfigured termination settings for use when that DIMM is neither a source or a destination for the direct data transfer. In one embodiment, the DIMM may be arranged to use the same preconfigured termination settings at step 785 irrespective of which other memory modules are being used as the source memory module and the destination memory module, but alternatively it is possible that the termination settings applied may be dependent on which memory module is being used as a source and which memory module is being used as a destination.

It will be appreciated that various types of termination methodologies may be used depending on how the resistors implementing the termination are connected to the relevant transmission line of the communication infrastructure. The termination settings will be determined accordingly, in order to ensure that the correct amount of resistance is applied at each termination point to seek to ensure that the impedance of every location on the transmission line is uniform throughout its length in order to thereby minimise distortion of the signal propagated over the transmission line.

Figure 13:
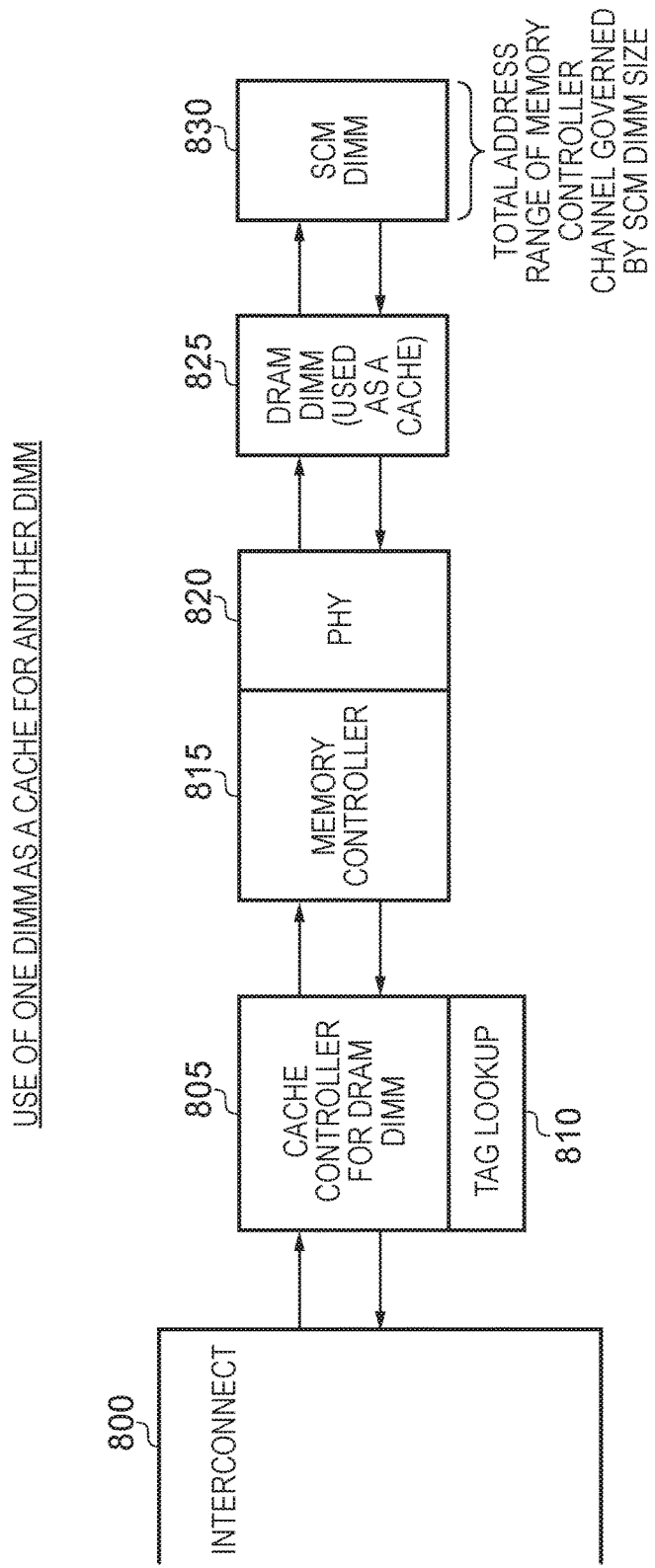
FIG. 13 is a block diagram illustrating how one memory module may be used as a cache for another memory module within the same memory channel, in accordance with one embodiment.

FIG. 13 illustrates an example arrangement where one of the DIMMs is used as a cache for one of the other DIMMs connected to the same memory channel. In this example, it is assumed that a DRAM DIMM 825 is used as a cache for an SCM DIMM 830. This may be a useful deployment due for example to the DRAM DIMM effectively being smaller but faster to access than the larger, cheaper and slower SCM DIMM 830.

As shown in FIG. 13, the DRAM DIMM 825 and SCM DIMM 830 can be connected via the physical layer interface 820 to the memory controller 815. In addition, a cache controller 805 for the DRAM DIMM can be provided, which in one embodiment can be viewed as being logically placed between the interconnect 800 and the memory controller 815. In particular, the cache controller can analyse the access requests received from the interconnect, and can perform a tag lookup within the tag lookup structure 810 in order to determine whether the data being accessed resides within the DRAM DIMM being used as a cache. In particular, in such a cache approach, assuming the DIMMs 825 and 830 are the only DIMMs connected to the memory channel, the total address range of the memory channel is that address range covered by the SCM DIMM 830, and the DRAM DIMM does not have its own separate address range that is visible to the system. Instead, data is moved between the SCM DIMM and the DRAM DIMM using normal cache allocation techniques, and accordingly the tag lookup can be used to determine for any read or write access where the data actually physically resides. The read or write commands can then be adjusted accordingly by the cache controller prior to forwarding on to the memory controller 815 in order to ensure that data is accessed from the correct physical location.

In addition, the cache controller can apply normal cache allocation policies in order to decide when to allocate data into the DRAM DIMM, and when to evict data from the DRAM DIMM back to the SCM DIMM. Data transfer requests can be issued by the cache controller to the memory controller in such instances, specifying the required source and destination addresses, where either the source or the destination address is associated with the DRAM DIMM, and the other of the source and destination address is associated with the SCM DIMM. This process is illustrated schematically by the flow diagram of FIG. 14.

In particular, at step 850 the cache controller 805 applies the cache allocation policy in order to identify whether data should be moved into or out of the DRAM DIMM. As soon as it is determined that such a move should take place, then at step 855 an appropriate move access request is created and forwarded to the memory controller. As discussed earlier with reference to FIG. 4, the data transfer controller 90 can then analyse such a move access request when it is residing within the pending access requests buffer, will determine that the source and destination addresses relate to different DIMMs, and will hence cause the required modified read and write access commands to be inserted into the buffer for subsequent transmission via the physical layer interface.

Figure 14:
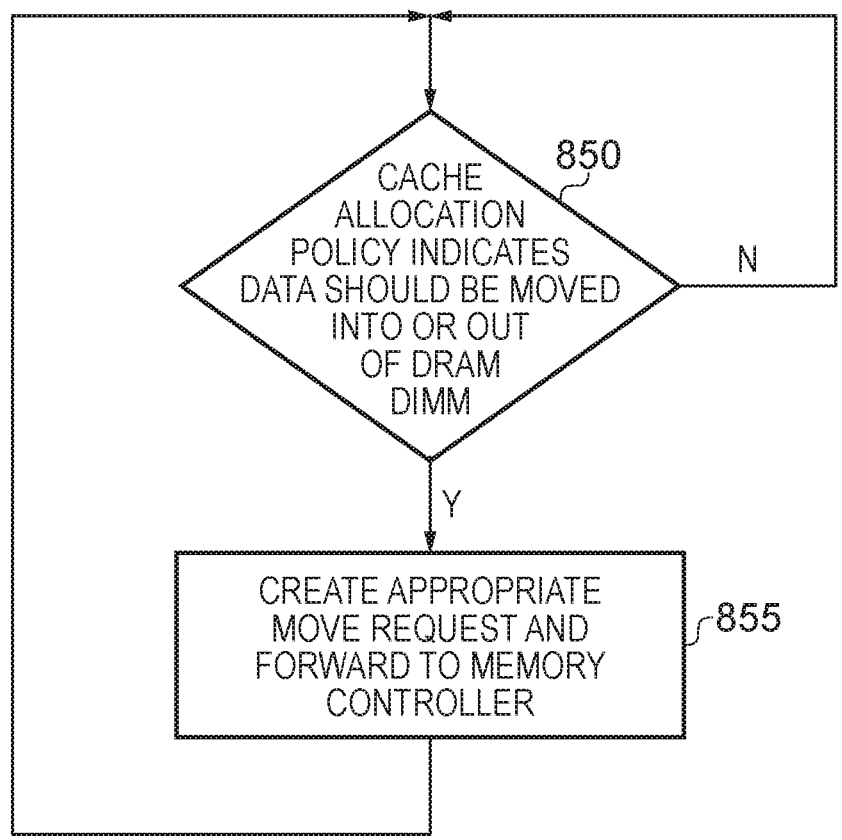
FIG. 14 is a flow diagram illustrating how the cache controller of FIG. 13 may insert transfer requests into the request stream handled by the memory controller in accordance with one embodiment.

Whilst the approach of FIGS. 13 and 14 describes a hardware implemented cache approach, in an alternative embodiment a software implemented cache approach could be adopted where both the DRAM DIMM 825 and the SCM DIMM 830 have their own separate address ranges within the accessible memory address space, and virtual to physical address translation techniques implemented by memory management units (MMUs) and the like can be used to determine how virtual addresses are mapped to physical addresses, and hence whether any particular item of data resides within the faster DRAM DIMM 825 or the slower SCM DIMM 830, hence enabling certain data to be accessed more quickly than other data, producing similar effects to hardware caching of data.

From the above described embodiments, it will be seen that such embodiments, through the provision of the direct data transfer technique described, enable lower latency, lower power consumption and higher bus efficiency in systems where memory modules having different memory characteristics occupy the same memory channel. For example, in such instances, one of the memory modules may be used as a software or hardware managed cache for another one of the memory modules.

However, the direct data transfer technique can also have benefits in other embodiments where it may not necessarily be the case that the individual memory modules have different characteristics. For example, it is known to provide for in-field replacement of DIMMs. In accordance with known techniques, when a DIMM is identified to be failing, typically the data is copied to a back-up DIMM. This process is ideally performed with minimal loss of service to the system and in minimal time to pre-empt total DIMM failure. However, in accordance with existing techniques, it would be necessary to issue a series of read and write commands in order to read the data out of one DIMM back to the memory controller, and then to subsequently issue that data from the memory controller to the replacement DIMM. However, this "copy to replacement" process could be achieved much more quickly using the direct data transfer mechanism of the described embodiments, thus saving both system bandwidth and reducing the margin required before triggering the in-field replacement process.

The enhanced training capabilities offered by certain of the described embodiments can also offer additional benefits. Using existing techniques, each DIMM is typically trained individually, and the memory controller may require additional cycles between transfers to separate DIMMs so as to adjust its delay circuitry for different settings. However, by providing the refined training mechanisms described earlier where individual DIMMs may also initiate training sequences, this may offer the ability to reduce the need for differing delays, thereby improving bus utilisation.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
a memory controller and a plurality of memory modules; wherein:
the memory controller, in order to control direct data transfer, is configured to:
issue a first direct transfer command to a first memory module of the plurality of memory modules, wherein the first direct transfer command comprises information indicating that the first memory module should transmit data bypassing the memory controller; and
issue a second direct transfer command to a second memory module of the plurality of memory modules, wherein the second direct transfer command comprises information indicating that the second memory module should store the data received directly from the first memory module;
the first memory module is configured to:
receive the first direct transfer command from the memory controller; and
directly transmit the data for receipt by the second memory module in dependence on the first direct transfer command; and
the second memory module is configured to:
receive the second direct transfer command from the memory controller;
receive the data from the first memory module directly; and
store the data in dependence on the second direct transfer command.

2. An apparatus as claimed in claim 1, further comprising:
a communications infrastructure interconnecting the memory controller and the plurality of memory modules;
the memory controller having a shared interface to communicate with said plurality of memory modules;
the memory controller configured to control the direct data transfer between the first memory module and the second memory module by issuing the first and second direct transfer commands via the shared interface; and
the first memory module and the second memory module operating in response to said first and second direct transfer commands to cause the data to be transferred over the communications infrastructure from the first memory module to the second memory module, bypassing the memory controller.

3. An apparatus as claimed in claim 2, wherein issuance by the memory controller of said first and second direct transfer commands causes the first memory module to perform a read operation to output the data onto the communications infrastructure, and causes the second memory module to perform a write operation to store the data output onto the communications infrastructure by the first memory module, a relative timing of the read operation and the write operation being controlled to ensure that at the time the write operation is performed by the second memory module, the first memory module is outputting the data onto the communications infrastructure.

4. An apparatus as claimed in claim 3, wherein said first direct transfer command comprises a read command issued to the first memory module and said second direct transfer command comprises a write command issued to the second memory module, the read command and the write command specifying the relative timing for the read operation and the write operation.

5. An apparatus as claimed in claim 1, wherein said first and second direct transfer commands are the same direct transfer command.

6. An apparatus as claimed in claim 2, wherein at least one of the first memory module and the second memory module comprises direct transfer handling circuitry to perform at least one operation to ensure compliance of the direct data transfer with communication protocol rules of the communications infrastructure.

7. An apparatus as claimed in claim 6, wherein:
said first direct transfer command causes the first memory module to perform a read operation to output the data onto the communications infrastructure; and
the direct transfer handling circuitry is provided in at least the first memory module and is configured to perform, as said at least one operation, a check code generation operation to generate a check code for the data and to output the check code to the second memory module.

8. An apparatus as claimed in claim 6, wherein:
each of the first and second memory modules comprises a physical layer interface for coupling to the communications infrastructure, and the direct transfer handling circuitry comprises training circuitry, responsive to a training event, to perform, as the at least one operation, a training operation of the corresponding physical layer interface in order to determine control values used to control timing of signals issued during performance of said direct data transfer between the first memory module and the second memory module.

9. An apparatus as claimed in claim 8, wherein the direct transfer handling circuitry further comprises synchronisation control circuitry to store the control values determined during the training operation, and to use the stored control values to control the timing of signals issued during a subsequent performance of said direct data transfer.

10. An apparatus as claimed in claim 6, wherein:
the direct transfer handing circuitry comprises termination control circuitry to perform, as said at least one operation, a termination setting operation to configure termination components within an associated memory module dependent on whether a currently processed command identifies the direct data transfer or identifies a transfer to be performed between the memory controller and the associated memory module.

11. An apparatus as claimed in claim 10, wherein when the currently processed command identifies the direct data transfer, the termination setting operation configures the termination components within the associated memory module dependent on whether the associated memory module is the first memory module or the second memory module.

12. An apparatus as claimed in claim 1, wherein the memory controller comprises direct transfer control circuitry that is responsive to a transfer access request received by the memory controller that requires data to be transferred between the first and second memory modules, to control issuance of the first and second direct transfer commands required to cause the direct data transfer to be performed.

13. An apparatus as claimed in claim 12, wherein the memory controller comprises a pending access requests buffer to store pending access requests to be processed, and the direct transfer control circuitry is responsive to the presence of a transfer access request in the pending access requests buffer that requires data to be transferred between the first and second memory modules, to update the pending access requests buffer to identify the first and second direct transfer commands required to cause the direct data transfer to be performed.

14. An apparatus as claimed in claim 1, wherein the first memory module has a different memory characteristic than the second memory module.

15. An apparatus as claimed in claim 14, wherein one of the first and second memory modules is used as a cache for data stored in the other one of the first and second memory modules.

16. An apparatus as claimed in claim 15, further comprising:
a cache controller to control use of said one of the first and second memory modules as a cache, the cache controller being configured to apply a cache allocation policy, and to issue at least one transfer access request to the memory controller when the cache allocation policy indicates that a block of data should be transferred between the first and second memory modules.

17. An apparatus as claimed in claim 1, wherein the direct data transfer comprises one of a data move operation and a data copy operation.

\* \* \* \* \*